(12) United States Patent
Inagaki

(10) Patent No.: US 8,363,089 B2
(45) Date of Patent: Jan. 29, 2013

(54) IMAGE CONVERTER

(75) Inventor: Koji Inagaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 404 days.

(21) Appl. No.: 12/544,240

(22) Filed: Aug. 20, 2009

(65) Prior Publication Data

US 2010/0053325 A1 Mar. 4, 2010

(30) Foreign Application Priority Data

Sep. 3, 2008 (JP) ................................. 2008-225570

(51) Int. Cl.
*H04N 7/00* (2011.01)
*H04N 7/18* (2006.01)
(52) U.S. Cl. ................ 348/39; 348/36; 348/37; 348/38; 348/143; 348/144
(58) Field of Classification Search .......... 348/143–159, 348/36–39
See application file for complete search history.

(56) References Cited

U.S. PATENT DOCUMENTS

| | | | |
|---|---|---|---|
| 5,185,667 A | | 2/1993 | Zimmermann |
| 5,359,363 A | * | 10/1994 | Kuban et al. .................... 348/36 |
| 7,714,936 B1 | * | 5/2010 | Martin et al. ................. 348/576 |
| 7,961,980 B2 | | 6/2011 | Shih |
| 2001/0010555 A1 | * | 8/2001 | Driscoll, Jr. .................. 348/335 |

FOREIGN PATENT DOCUMENTS

| | | |
|---|---|---|
| JP | 3012142 | 10/1999 |
| JP | 3025255 | 1/2000 |
| JP | 3051173 | 3/2000 |
| JP | 3126955 | 11/2000 |

\* cited by examiner

*Primary Examiner* — Chikaodili E Anyikire
(74) *Attorney, Agent, or Firm* — Ladas & Parry LLP

(57) ABSTRACT

Any given part is cut out from a distorted circular image photographed by use of a fisheye lens and converted into a planar regular image with less distortion. A virtual sphere H having a radius R on a distorted circular image S on an XY plane is defined, thereby allowing a user to designate a cut-out center point P, a magnification m, and a planar inclination angle ϕ. A visual line vector n passing through an intersecting point Q immediately above the point P is determined to define an UV orthogonal coordinate system having an orientation depending on the angle ϕ on a plane orthogonal to a visual line vector n at a point G in which a distance between two points OG is given as m·R. The UV orthogonal coordinate system is curved along the side face C of a "virtual cylindrical column in which the point G forms one point on the side face to have a straight line V' parallel to the V axis and also passing through the point O as a central axis," thereby defining the UV curved coordinate system. Correspondence relationship equations between a point Ci (ui, vi) on the UV curved coordinate system and a point Si (xi, yi) on the XY coordinate system are used to obtain an image in the vicinity of a point P on the UV curved coordinate system, and the image is expanded on a plane T to obtain a planar regular image.

11 Claims, 18 Drawing Sheets

FIG. 17

PRIOR ART $$x = \frac{R(uA+vB+wC)}{\sqrt{u^2+v^2+w^2}} \quad (1)$$

$$y = \frac{R(uD+vE+wF)}{\sqrt{u^2+v^2+w^2}} \quad (2)$$

HERE, $$A = \cos\phi\cos\alpha - \sin\phi\sin\alpha\cos\beta \quad (3)$$

$$B = -\sin\phi\cos\alpha - \cos\phi\sin\alpha\cos\beta \quad (4)$$

$$C = \sin\beta\sin\alpha \quad (5)$$

$$D = \cos\phi\sin\alpha + \sin\phi\cos\alpha\cos\beta \quad (6)$$

$$E = -\sin\phi\sin\alpha + \cos\phi\cos\alpha\cos\beta \quad (7)$$

$$F = -\sin\beta\cos\alpha \quad (8)$$

$$w = mR \quad (9)$$

$$u' = w \cdot \sin\theta \quad (12)$$

$$w' = w \cdot \cos\theta \quad (13)$$

SINCE THE LENGTH OF THE CIRCULAR ARC A

IS EQUAL TO VALUE u, $\theta = \dfrac{u}{w}$ RADIAN.

THEREFORE, $u' = w \cdot \sin\dfrac{u}{w} \quad (14)$ $$w' = w \cdot \cos\dfrac{u}{w} \quad (15)$$

FIG. 21

$$x = \frac{R(u'A + vB + w'C)}{\sqrt{u'^2 + v^2 + w'^2}} \quad (1')$$

$$y = \frac{R(u'D + vE + w'F)}{\sqrt{u'^2 + v^2 + w'^2}} \quad (2')$$

WHERE COMMON COEFFICIENT $G$ IS DEFINED AS $$G = R / \sqrt{u'^2 + v^2 + w'^2} \quad \text{AND USING (14), (15):}$$

$$G = R / \sqrt{(w^2 \cdot \sin^2 \tfrac{u}{w}) + v^2 + (w^2 \cdot \cos^2 \tfrac{u}{w})}$$

$$= R / \sqrt{w^2 (\sin^2 \tfrac{u}{w} + \cos^2 \tfrac{u}{w}) + v^2}$$

$$= R / \sqrt{w^2 + v^2}$$

THEREFORE, $$\begin{cases} x = G(u'A + vB + w'C) & (16) \\ y = G(u'D + vE + w'F) & (17) \\ G = R / \sqrt{w^2 + v^2} & (18) \end{cases}$$

(a) ORTHOGONALLY PROJECTED IMAGE $r = f \cdot \sin\beta$ (b) EQUIDISTANTLY PROJECTED IMAGE $r = f \cdot \beta$

FIG. 26

FIRST COORDINATE CONVERSION EQUATIONS

COORDINATES (xb, yb) ON THE EQUIDISTANTLY PROJECTED IMAGE  COORDINATES (xa, ya) ON THE ORTHOGONALLY PROJECTED IMAGE $$xa = xb \left(\frac{R}{r}\right) \sin\left(\frac{\pi r}{2R}\right) \quad (19)$$

$$ya = yb \left(\frac{R}{r}\right) \sin\left(\frac{\pi r}{2R}\right) \quad (20)$$

WHEREIN $r = \sqrt{(xb^2 + yb^2)}$

SECOND COORDINATE CONVERSION EQUATIONS

COORDINATES (xa, ya) ON THE ORTHOGONALLY PROJECTED IMAGE  COORDINATES (xb, yb) ON THE EQUIDISTANTLY PROJECTED IMAGE $$xb = xa \left(\frac{2R}{\pi r}\right) \sin^{-1}\left(\frac{r}{R}\right) \quad (21)$$

$$yb = ya \left(\frac{2R}{\pi r}\right) \sin^{-1}\left(\frac{r}{R}\right) \quad (22)$$

WHEREIN $r = \sqrt{(xa^2 + ya^2)}$

IMAGE CONVERTER

BACKGROUND OF THE INVENTION

The present invention relates to an image converter and in particular to an apparatus for conducting processes of cutting out a part of a distorted circular image photographed by use of a fisheye lens and converting it into a planar regular image.

A fisheye lens can be used to obtain hemispherical circular images in all directions without using a mechanical moving mechanism. Therefore, a fisheye lens has been extensively used in photographing scenic pictures and others aiming at eccentric effect. However, images photographed by use of a fisheye lens are distorted in circular images, and the images may be used for artistic pictures, as they are, but not suitable for general photographic uses.

Thus, there has been proposed an apparatus for conducting process of converting a distorted circular image photographed by use of a fisheye lens into a planar regular image with less distortion. For example, Japanese Patents No. 3012142 and No. 3051173 have disclosed technologies by which a computer is used to convert a portion of a distorted circular image to a planar regular image in real time. When this conversion technique is utilized, it is possible to convert a dynamic image made up of distorted circular images photographed by use of a fisheye lens to a dynamic image made up of planar regular images and observe it in real time. Application to a monitoring system and others having a 180-degree field angle is expected.

On the other hand, in Japanese Patent No. 3025255, there has been disclosed a technique for providing a panoramic display in the horizontal direction by converting a distorted circular image photographed by use of a fisheye lens into an image developed on a cylindrical face. Further, in Japanese Patent No. 3126955, there has been disclosed a technique for relieving the load of hardware by replacing division and other function operations necessary on conversion of a distorted circular image to a planar regular image with a process to refer to a lookup table.

In recent years, there has been widely used a fisheye lens monitoring system in which a security camera equipped with a fisheye lens is installed on ceilings and walls of a building to display an image photographed by use of the security camera on a monitoring device. In this application, it is required to obtain a planar regular image from which any distortion is removed as much as possible due to a necessity for recognizing the face of a person and features of clothing on a monitoring screen. However, it is difficult to obtain such a distortion-free planar regular image that can satisfy the above demand by using image converters conventionally proposed.

For example, use of the techniques disclosed in the above-described Japanese Patents No. 3012142 and No. 3051173 enables to obtain a rectangular planar regular image by cutting out a part desired by a user from a distorted circular image photographed by use of a fisheye lens. However, the thus obtained planar regular image is distorted and inadequate for an application to confirm detailed features of a person. In particular, since the thus obtained rectangular planar regular image is greatly distorted in particular at an external part (in the vicinity of a contour), it is impossible to obtain a smooth panning image in a case where a cut-out portion is gradually moved to conduct a horizontal panning.

On the other hand, the technique disclosed in the above-described Japanese Patent No. 3025255 provides a panoramic image longer in the horizontal direction. Therefore, a part of the image is cut out to be displayed on a monitoring screen, thus making it possible to obtain a smooth panning image even when a horizontal panning is conducted. However, a panoramic image obtained by this technique is distorted greatly in the perpendicular direction although distorted to a small extent in the horizontal direction, and restriction is imposed on a region at which an image can be cut out. More specifically, even if a semi-sphere region is photographed, a planar regular image which is cut out from the vicinity of the top is greatly distorted. Therefore, it is actually impossible to cut out the vicinity of the top. As described above, if restriction is imposed on a part of an image that can be cut out, it is unfavorable because a blind spot is caused when the technique is applied to a security camera.

Therefore, an object of the present invention is to provide an image converter which is capable of cutting out any desired part from a distorted circular image photographed by use of a fisheye lens to convert it into a planar regular image with less distortion.

SUMMARY OF THE INVENTION

According to the image converter of the present invention, such processing is conducted so that individual pixels of a distorted circular image on a two-dimensional XY orthogonal coordinate system are allowed to correspond to pixels on a two-dimensional UV curved coordinate system which is curved along the side face of a cylindrical column. Therefore, it is possible to obtain a planar regular image by cutting out any desired part from a distorted circular image photographed by use of a fisheye lens and also obtain a planar regular image with less distortion.

(1) The first feature of the present invention resides in an image converter for performing processes of cutting out a part of a distorted circular image photographed by use of a fisheye lens and converting said part into a planar regular image, the image converter comprising:

a distorted circular image memory for storing a distorted circular image constituted with an aggregate of many pixels arranged at a position indicated by coordinates (x, y) on a two-dimensional XY orthogonal coordinate system and having a radius R taking an origin O of the two-dimensional XY orthogonal coordinate system as a center;

a planar regular image memory for storing a planar regular image constituted with an aggregate of many pixels arranged at a position indicated by coordinates (u, v) on a two-dimensional UV orthogonal coordinate system;

a parameter input unit in which in a three-dimensional XYZ orthogonal coordinate system including the two-dimensional XY orthogonal coordinate system, a visual line vector n facing any given direction, with the origin O given as a starting point, is input as a parameter indicating a cut-out position of the planar regular image, a predetermined planar inclination angle φ is input as a parameter indicating a cut-out orientation of the planar regular image, and a predetermined magnification m is input as a parameter indicating a cut-out dimension of the planar regular image;

a corresponding coordinate calculating unit calculating corresponding coordinates (x, y) which correspond to any given coordinates (u, v) by using predetermined correspondence relationship equations showing a correspondence relationship between coordinates (u, v) on a two-dimensional UV curved coordinate system and coordinates (x, y) on the two-dimensional XY orthogonal coordinate system, wherein said two-dimensional UV curved coordinate system is defined by curving a two-dimensional UV orthogonal coordinate system which is arranged on a plane passing through a point G given as an origin and orthogonal to the visual line vector n to have an orientation according to the planar inclination angle φ, said point G being away from the origin O by "a product m·R of the magnification m and the radius R" on the visual line vector n, along a side face of a "virtual cylindrical column in which the point G gives one point on the side face thereof to have a central axis parallel to a V axis of the two-dimensional UV orthogonal coordinate system,"; and a planar regular image forming unit giving coordinates (u, v) of a target pixel constituting the planar regular image to the corresponding coordinate calculating unit to obtain corresponding coordinates (x, y), reading out a pixel value of a pixel arranged in the vicinity of the obtained corresponding coordinates (x, y) inside the distorted circular image memory, determining a pixel value of the target pixel on the basis of a read pixel value, thereby forming the planar regular image by determining pixel values of individual pixels, and writing the pixel values into the planar regular image memory.

(2) The second feature of the present invention resides in an image converter according to the first feature, wherein when, with respect to a virtual sphere having the radius R taking the origin O as a center, a corresponding point Qi is taken on the sphere which corresponds to a point Si indicated by coordinates (xi, yi) on the two-dimensional XY orthogonal coordinate system depending on a projection method of a fisheye lens used, and coordinates (ui, vi) are taken on the two-dimensional UV curved coordinate system at an intersecting point Ci between a straight line connecting the origin O with the corresponding point Qi on the sphere and a cylindrical column side-face coordinate plane of the two-dimensional UV curved coordinate system, the corresponding coordinate calculating unit uses correspondence relationship equations by which the coordinates (xi, yi) are determined as corresponding coordinates which correspond to the coordinates (ui, vi).

(3) The third feature of the present invention resides in an image converter according to the second feature, wherein when a distorted circular image stored in the distorted circular image memory is an orthogonally projected image photographed by use of a fisheye lens based on an orthogonal projection method, the corresponding coordinate calculating unit uses correspondence relationship equations of orthogonally projected images in which, with respect to a point Si indicated by coordinates (xi, yi), a point indicated by coordinates (xi, yi, zi) given as an intersecting point between a straight line passing through the point Si and parallel to a Z axis and the virtual sphere is given as a corresponding point Qi on the sphere, and when a distorted circular image stored in the distorted circular image memory is a non-orthogonally projected image photographed by use of a fisheye lens based on a non-orthogonal projection method, the corresponding coordinate calculating unit uses correspondence relationship equations of non-orthogonally projected images obtained by using coordinate conversion equations between coordinates on the orthogonally projected image and coordinates on the non-orthogonally projected image so as to correct the correspondence relationship equations of orthogonally projected images.

(4) The fourth feature of the present invention resides in an image converter according to the third feature, wherein the corresponding coordinate calculating unit defines the two-dimensional UV curved coordinate system by using the virtual cylindrical column in which the point G gives one point on the side face thereof to have a central axis parallel to the V axis of the two-dimensional UV orthogonal coordinate system and also passing through the origin O of the three-dimensional XYZ orthogonal coordinate system.

(5) The fifth feature of the present invention resides in an image converter according to the fourth feature, wherein the corresponding coordinate calculating unit uses the following equations as correspondence relationship equations of orthogonally projected images indicating a correspondence relationship between coordinates (u, v) and coordinates (x, y), $x = G(u'A + vB + w'C)$ $y = G(u'D + vE + w'F)$, under the following definitions in which an angle formed between an orthogonal projection on the XY plane of a visual line vector n and a Y axis is given as an azimuthal angle $\alpha$ and an angle formed between the visual line vector n and a positive direction of the Z axis is given as a zenithal angle $\beta$, $A = \cos\phi \cos\alpha - \sin\phi \sin\alpha \cos\beta$ $B = -\sin\phi \cos\alpha - \cos\phi \sin\alpha \cos\beta$ $C = \sin\beta \sin\alpha$ $D = \cos\phi \sin\alpha + \sin\phi \cos\alpha \cos\beta$ $E = -\sin\phi \sin\alpha + \cos\phi \cos\alpha \cos\beta$ $F = -\sin\beta \cos\alpha$ $G = R/\sqrt{(w^2 + v^2)}$ $w = mR$ $u' = w' \sin(u/w)$ $w' = w' \cos(u/w)$.

(6) The sixth feature of the present invention resides in an image converter according to the fifth feature, wherein the corresponding coordinate calculating unit including:

a rotational coefficient operation unit in which, when the visual line vector n and the planar inclination angle $\phi$ are given from the parameter input unit, on the basis of the visual line vector n, the azimuthal angle $\alpha$ and the zenithal angle $\beta$ are determined, and rotational coefficients A, B, C, D, E, F are calculated on the basis of the following operational equations, $A = \cos\phi \cos\alpha - \sin\phi \sin\alpha \cos\beta$ $B = -\sin\phi \cos\alpha - \cos\phi \sin\alpha \cos\beta$ $C = \sin\beta \sin\alpha$ $D = \cos\phi \sin\alpha + \sin\phi \cos\alpha \cos\beta$ $E = -\sin\phi \sin\alpha + \cos\phi \cos\alpha \cos\beta$ $F = -\sin\beta \cos\alpha$;

a common coefficient operation unit in which, when the magnification m is given from the parameter input unit and a coordinate v is given from the planar regular image forming unit, the radius R of the distorted circular image is used to calculate a common coefficient G on the basis of the following operational equations, $w = mR$ $G = R/\sqrt{(w^2 + v^2)}$;

a curved coordinate correcting unit in which, when the magnification m is given from the parameter input unit and a coordinate u is given from the planar regular image forming unit, the radius R of the distorted circular image is used to calculate u' and w' on the basis of the following operational equations, $$w = mR$$

$$u' = w' \sin(u/w)$$

$$w' = w' \cos(u/w); \text{ and}$$

an xy coordinate value calculating unit in which the coordinate v given from the planar regular image forming unit, the rotational coefficients A, B, C, D, E, F calculated by the rotational coefficient operation unit, the common coefficient G calculated by the common coefficient operation unit, the u' and w' calculated by the curved coordinate correcting unit, and the radius R of the distorted circular image are used to calculate x and y on the basis of the following operational equations, $$x = G(u'A + vB + w'C)$$

$$y = G(u'D + vE + w'F).$$

(7) The seventh feature of the present invention resides in an image converter according to the sixth feature, wherein the parameter input unit has a function of inputting the radius R as a variable parameter on the basis of instructions from a user or a distorted circular image stored in a distorted circular image memory, and the common coefficient operation unit and the curved coordinate correcting unit use the radius R input by the parameter input unit to perform an operation.

(8) The eighth feature of the present invention resides in an image converter according to the third feature, wherein when a distorted circular image stored in the distorted circular image memory is an equidistantly projected image photographed by use of a fisheye lens based on the equidistance projection method, the corresponding coordinate calculating unit uses the following coordinate conversion equations for converting coordinates (xa, ya) on the orthogonally projected image into coordinates (xb, yb) on the equidistantly projected image, $$xb = xa(2R/\pi r)\sin^{-1}(r/R)$$

$$yb = ya(2R/\pi r)\sin^{-1}(r/R)$$

wherein the condition is $r = \sqrt{(xa^2 + ya^2)}$, thereby correcting the correspondence relationship equations of orthogonally projected images.

(9) The ninth feature of the present invention resides in an image converter according to the first feature, wherein the parameter input unit inputs coordinates (x0, y0) of a cut-out center point P on the two-dimensional XY orthogonal coordinate system as a parameter for defining the visual line vector n and defines a virtual sphere having the radius R at the center of an origin O in a three-dimensional XYZ orthogonal coordinate system, when a distorted circular image stored in the distorted circular image memory is an orthogonally projected image photographed by use of a fisheye lens based on the orthogonal projection method, the parameter input unit defines an intersecting point Q between a straight line passing through the cut-out center point P and parallel to the Z axis and the virtual sphere, thereby giving a vector which starts from the origin O to pass through the intersecting point Q as the visual line vector n, and when a distorted circular image stored in the distorted circular image memory is a non-orthogonally projected image photographed by use of a fisheye lens based on the non-orthogonal projection method, the parameter input unit uses coordinate conversion equations between coordinates on the orthogonally projected image and coordinates on the non-orthogonally projected image to correct coordinates of the cut-out center point P and defines an intersecting point Q between a straight line passing through a point after correction and parallel to the Z axis and the virtual sphere, thereby giving a vector which starts from the origin O to pass through the intersecting point Q as the visual line vector n.

(10) The tenth feature of the present invention resides in an image converter according to the first feature, wherein the corresponding coordinate calculating unit arranges the two-dimensional UV orthogonal coordinate system in such an orientation that an angle formed between a rotational reference axis J given as an axis passing through an origin G, parallel to the XY plane and also orthogonal to the visual line vector n and the U axis is equal to the planar inclination angle φ.

(11) The eleventh feature of the present invention resides in an image converter according to the first feature, wherein the planar regular image stored in the planar regular image memory is rectangular in contour, the two-dimensional UV orthogonal coordinate system having the U axis in a direction parallel to the longer side of the rectangle and the V axis in a direction parallel to the shorter side is curved along the side face of the virtual cylindrical column having a central axis parallel to the V axis, thereby defining the two-dimensional UV curved coordinate system.

(12) The twelfth feature of the present invention resides in an image converter according to the first feature, wherein the planar regular image forming unit performs interpolation operation for pixel values of plural reference pixels on a distorted circular image arranged in the vicinity of a position indicated by corresponding coordinates (x, y) upon determination of a pixel value of a target pixel arranged at a position indicated by the coordinates (u, v).

(13) The thirteenth feature of the present invention resides in a computer readable recording medium containing a program for allowing a computer to function as the image converter according to the first feature.

(14) The fourteenth feature of the present invention resides in a semiconductor integrated circuit into which electronic circuits functioning as a corresponding coordinate calculating unit and a planar regular image forming unit which are constituents of the image converter according to the first feature are incorporated.

(15) The fifteenth feature of the present invention resides in a fisheye lens monitoring system including:

the image converter according to the first feature;
a digital camera equipped with a fisheye lens; and
a monitoring device for displaying a planar regular image on a screen;

wherein a distorted circular image photographed by use of the digital camera is stored in the distorted circular image memory, and a planar regular image obtained in the planar regular image memory is displayed by the monitoring device.

(16) The sixteenth feature of the present invention resides in an image conversion method for performing processes of cutting out a part of a distorted circular image photographed by use of a fisheye lens and converting said part into a planar regular image, the image conversion method including:

an image preparation step for storing in a distorted circular image memory a distorted circular image constituted with an aggregate of many pixels arranged at a position indicated by coordinates (x, y) on a two-dimensional XY orthogonal coordinate system and having a radius R taking an origin O of the two-dimensional XY orthogonal coordinate system as a center;

a parameter setting step for setting in a three-dimensional XYZ orthogonal coordinate system including the two-dimensional XY orthogonal coordinate system, a visual line vector n which faces any given direction with the origin O given as a starting point, as a parameter indicating a cut-out position of a planar regular image, a predetermined planar inclination angle φ as a parameter indicating a cut-out orientation of the planar regular image, and a predetermined magnification m as a parameter indicating a cut-out dimension of the planar regular image;

a corresponding coordinate calculating step in which an operation device calculates corresponding coordinates (x, y) which correspond to coordinates (u, v) of one target pixel for a planar regular image made up of an aggregate of many pixels arranged at a positioned indicated by coordinates (u, v) on the two-dimensional UV orthogonal coordinate system;

a pixel value determining step in which the operation device reads out a pixel value of a pixel arranged in the vicinity of the corresponding coordinates (x, y) inside the distorted circular image memory, determining a pixel value of the target pixel on the basis of a thus read pixel value; and a pixel value writing step in which the operation device writes a pixel value determined with regard to the target pixel inside a planar regular image memory for storing the planar regular image;

wherein, in the corresponding coordinate calculating step, a point G on the visual line vector n spaced away from the origin O by "a product m·R of the magnification m and the radius R" being given as an origin, a two-dimensional UV orthogonal coordinate system arranged to have an orientation depending on the planar inclination angle φ on a plane passing through the point G and orthogonal to the visual line vector n is curved along a side face of "a virtual cylindrical column in which the point G gives one point on the side face to have a central axis parallel to the V axis of the two-dimensional UV orthogonal coordinate system," thereby defining a two-dimensional UV curved coordinate system, and predetermined correspondence relationship equations indicating a correspondence relationship between coordinates (u, v) on the two-dimensional UV curved coordinate system and coordinates (x, y) on the two-dimensional XY orthogonal coordinate system are used to calculate corresponding coordinates (x, y) which correspond to any given coordinates (u, v), thereby writing pixel values for all pixels necessary for constituting the planar regular image into the planar regular image memory.

(17) The seventeenth feature of the present invention resides in an image conversion method including:

a step for preparing a distorted circular image photographed by use of a fisheye lens as an aggregate of many pixels arranged at a position indicated by coordinates (x, y) on an XY plane in a three-dimensional XYZ orthogonal coordinate system;

a step for defining, at a desired position inside a space constituting the three-dimensional XYZ orthogonal coordinate system, a two-dimensional UV curved coordinate system constituted with a V axis arranged on a curved face along a side face of a virtual cylindrical column and parallel to a central axis of the virtual cylindrical column and a circular-arc U axis along a circumference of a circle constituting a cross section obtained by cutting the virtual cylindrical column with a face orthogonal to the V axis;

a step for obtaining a curved regular image constituted with an aggregate of many pixels on the two-dimensional UV curved coordinate system by using a correspondence relationship equation for allowing coordinates (u, v) on the two-dimensional UV curved coordinate system to correspond to corresponding coordinates (x, y) on the XY plane one by one to determine a pixel value of a pixel arranged at coordinates (u, v) on the two-dimensional UV curved coordinate system on the basis of a pixel value of a pixel arranged in the vicinity of the corresponding coordinates (x, y); and a step for converting the curved regular image into a planar regular image by expanding the two-dimensional UV curved coordinate system on a plane.

BRIEF DESCRIPTION OF THE DRAWINGS

FIG. 17 covers correspondence relationship equations for orthogonally projected images showing a correspondence relationship between coordinates (x, y) on the two-dimensional XY orthogonal coordinate system and coordinates (u, v) on the two-dimensional UV orthogonal coordinate system according to the prior art.

FIG. 21 covers correspondence relationship equations for orthogonally projected images showing a correspondence relationship between coordinates (x, y) on the two-dimensional XY orthogonal coordinate system and coordinates (u, v) on the two-dimensional UV curved coordinate system.

FIG. 26 is a view showing conversion equations for performing the coordinate conversion between coordinates on the equidistantly projected image and coordinates on the orthogonally projected image.

DESCRIPTION OF THE PREFERRED
EMBODIMENTS

Hereinafter, a description will be given for embodiments which illustrate the present invention.

<<<Section 1: Basic Principle of Image Conversion>>>

Figure 1:
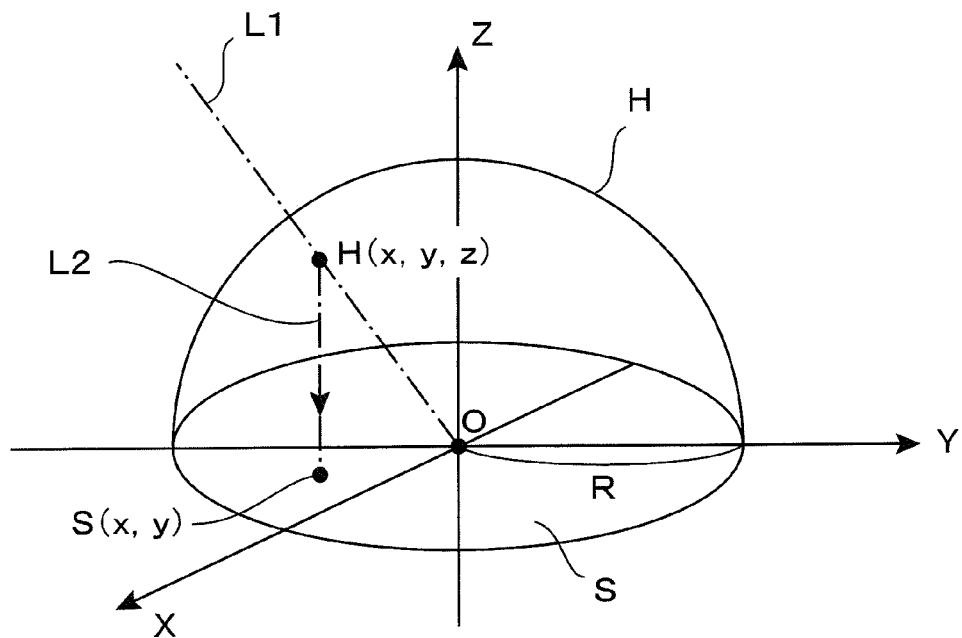
FIG. 1 is a perspective view showing a basic model of forming a distorted circular image S photographed by use of a fisheye lens based on the orthogonal projection method.

First, a description will be given for general characteristics of a distorted circular image photographed by use of a fisheye lens and a basic principle of cutting out a part thereof and converting it into a planar regular image. FIG. 1 is a perspective view showing a basic model of forming a distorted circular image S by photographing by use of a fisheye lens based on the orthogonal projection method. In general, fisheye lenses are classified into plural types, depending on projection methods thereof. The model shown in FIG. 1 is a fisheye lens based on the orthogonal projection method (a method for applying the present invention to fisheye lens based on projection other than those based on the orthogonal projection method will be described in Section 5).

FIG. 1 shows an example in which a distorted circular image S is formed on the XY plane in a three-dimensional XYZ orthogonal coordinate system. It is noted that in this case, as illustrated, an example is shown that the Z axis is given in the upper side in the view and a dome-shaped virtual sphere H (hemisphere) is defined in a positive region of the Z axis.

Figure 2:
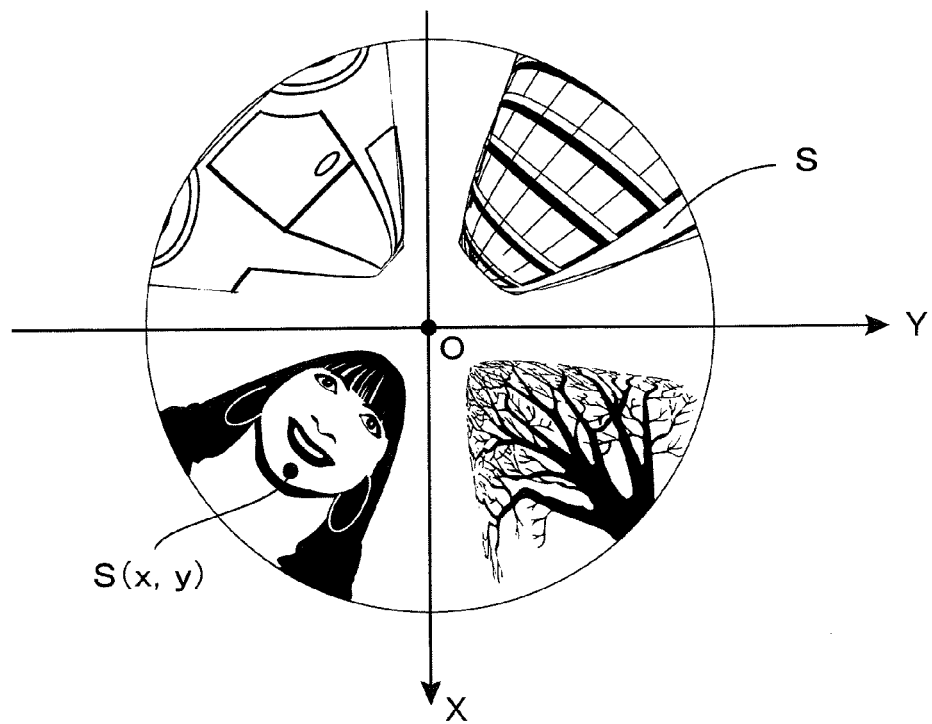
FIG. 2 is a plan view showing one example of the distorted circular image S photographed by use of a fisheye lens (a general image of the distorted circular image S and not an exact image thereof).

The distorted circular image S formed on the XY plane is an image which forms a circle with a radius R taking an origin O as the center of a coordinate system and corresponds to an image existing in a region having a 180-degree field angle on the positive region of the Z axis which has been distorted and recorded. FIG. 2 is a plan view showing one example of the distorted circular image S photographed by use of a fisheye lens. As described above, all images existing on the positive region of the Z axis are to be recorded in the distorted circular image. There is a difference in scale ratio of an image between the central part and the peripheral part thereof, by which the thus recorded image is distorted in shape. It is noted that the distorted circular image S shown in FIG. 2 is a distorted circular image in general for explanatory purpose photographed by use of a fisheye lens and not an exact image actually obtained by use of a fisheye lens.

A fisheye lens is actually constituted with an optical system in combination with a plurality of convex lenses and concave lenses. It is known that the optical characteristics can be modeled by the virtual sphere H as shown in FIG. 1. More specifically, regarding the model in which the dome-shaped virtual sphere H (hemisphere) with a radius R is arranged on the upper face of the distorted circular image S, it may be considered that, for the optical characteristics of a fisheye lens based on the orthogonal projection method, incident light L1 made incident from a normal line direction to any given point H (x, y, z) on the virtual sphere H behaves so as to move to a point S (x, y) on the XY plane as incident light L2 parallel to the Z axis. To put it the other way around, in FIG. 2, a pixel located at the point S (x, y) on the distorted circular image S indicates one point on an object existing on an extended line of the incident light L1 shown in FIG. 1.

As a matter of course, in optical phenomena actually found on a fisheye lens, a particular point of an object to be photographed forms an image on the particular point S (x, y) on the XY plane due to the refraction of a plurality of convex lenses and concave lenses. It is quite acceptable to hold a discussion that the optical system is replaced with a model of the virtual sphere H shown in FIG. 1 on image conversion or others. Therefore, a method under the assumption that this type of model is used has been shown also in the case of the image conversion disclosed in the above-described Patent Documents. The present invention will be described hereinafter also on the assumption that this type of model is to be used.

Figure 3:
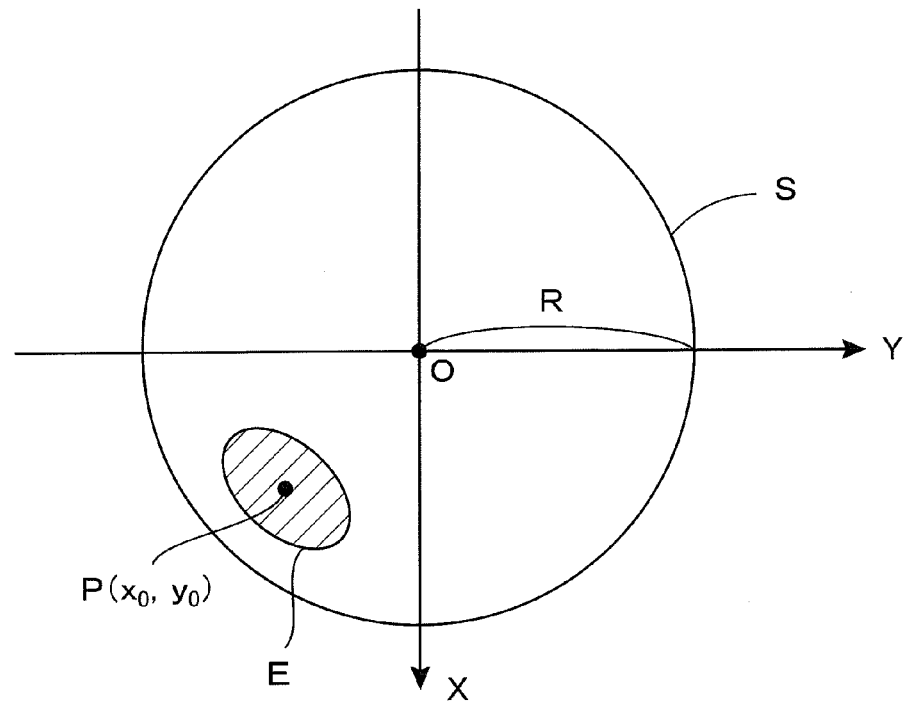
FIG. 3 is a plan view showing an example in which a cut-out region E is defined at a portion of the distorted circular image S.

An object of the image converter related to the present invention is to cut out a portion of a distorted circular image S and convert it to a planar regular image. For example, it is assumed that a user who has seen the distorted circular image S shown in FIG. 2 desires to observe an image of a woman depicted on the lower left of the drawing as a distortion-free correct image. In this case, the user is required to designate which part of the distorted circular image S is to be cut out and converted. For example, if a hatched cut-out region E shown in FIG. 3 is designated as a region to be converted, the most intuitive designation method will be to designate a position of the center point P (x0, y0). In the present application, a point P which is designated by the user is referred to as a cut-out center point P. As a matter of course, the cut-out center point P is not an accurate geometric center with regard to the cut-out region E because the distorted circular image S is a distorted image.

Figure 4:
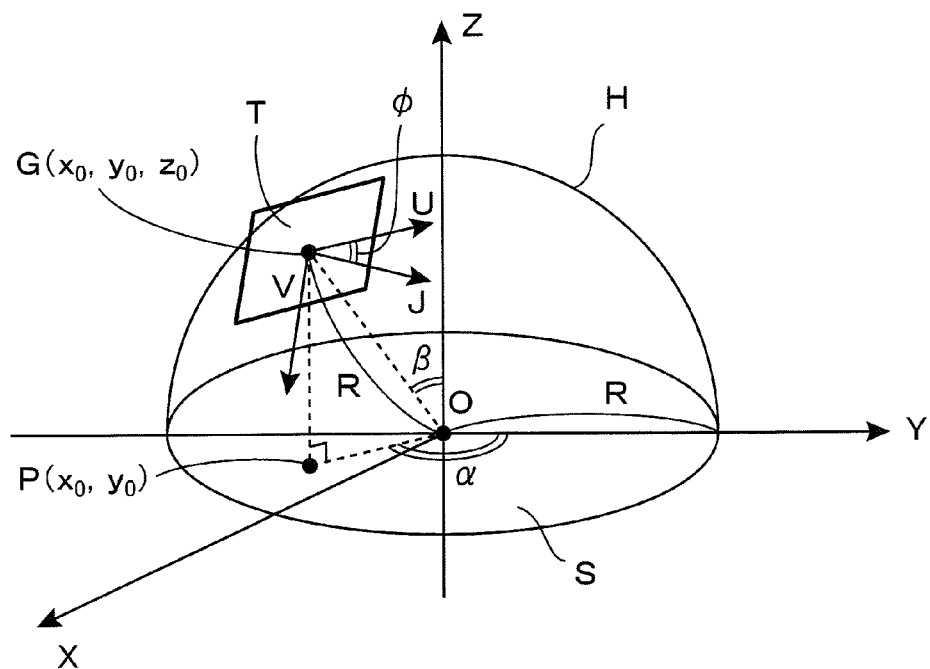
FIG. 4 is a perspective view showing a relationship between an XY orthogonal coordinate system including the distorted circular image S and a two-dimensional UV orthogonal coordinate system including a planar regular image T.

Here, in order to convert an image inside the cut-out region E taking the cut-out center point P (x0, y0) as a center to a planar regular image, considered is the following model. FIG. 4 is a perspective view showing a relationship between a two-dimensional XY orthogonal coordinate system including a distorted circular image S and a two-dimensional UV orthogonal coordinate system including a planar regular image T in this basic model. As shown in the figure, since the distorted circular image S is defined on the XY plane of a three-dimensional XYZ orthogonal coordinate system, the distorted circular image S in itself is an image defined on a two-dimensional XY orthogonal coordinate system. Thus, considered is an intersecting point G between a straight line passing through the cut-out center point P (x0, y0) defined on the distorted circular image and parallel to the Z axis and a virtual sphere H. This intersecting point G is a so-called point immediately above the cut-out center point P (x0, y0), and the position coordinate is (x0, y0, z0).

Next, at the intersecting point G (x0, y0, z0), a tangent plane in contact with the virtual sphere H is defined and a two-dimensional UV orthogonal coordinate system is defined on the tangent plane. Then, the planar regular image T is to be determined as an image on the two-dimensional UV orthogonal coordinate system. In the case of the example shown in FIG. 4, the two-dimensional UV orthogonal coordinate system is defined so that the intersecting point G (x0, y0, z0) can be set as an origin. As a result, an origin G of the UV coordinate system in this model is set at any position on the virtual sphere H, and the UV plane constituting the UV coordinate system is in alignment with the tangent plane with respect to the virtual sphere H at the position of this origin G.

The position of the intersecting point G (x0, y0, z0) which is given as an origin of the UV coordinate system can be identified by an azimuthal angle α and a zenithal angle β, as shown in the figure. In this case, the azimuthal angle α (0≦α<360°) is an angle formed between a straight line connecting a cut-out center point P (x0, y0) with an origin O of the XY coordinate system and the Y axis. The zenithal angle β (0≦β<90°) is an angle (acute angle) formed between a straight line connecting a point G (x0, y0, z0) to be given as an origin of the UV coordinate system with an origin O of the XY coordinate system and the Z axis.

As described above, the UV plane can be identified by designating the azimuthal angle α and the zenithal angle β. However, in order to determine the UV coordinate system, it is necessary to designate still another angle φ. This angle φ is a parameter showing an orientation of the UV coordinate system having a straight line OG as a rotational axis, and in the example shown in FIG. 4, it is defined as an angle formed between the U axis and the J axis. In this case, the J axis is an axis passing through a point G (x0, y0, z0) parallel to the XY plane and also orthogonal to the straight line OG. This axis is hereinafter referred to as a rotational reference axis. In conclusion, when a vector U facing the direction of the U axis in the UV coordinate system and a vector J facing the direction of the rotational reference axis J are defined, the angle φ is defined as an angle formed between the vector U and the vector J. This angle is usually referred to as a "planar inclination angle."

Figure 5:
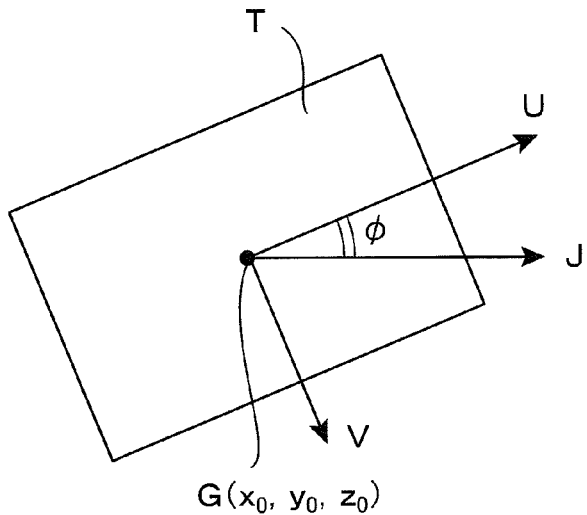
FIG. 5 is a plan view showing a relationship between the planar regular image T and the planar inclination angle φ defined on the two-dimensional UV orthogonal coordinate system.

FIG. 5 is a plan view showing a relationship between the planar regular image T defined on the UV coordinate system and the planar inclination angle φ. In the example shown in this figure drawing, the planar regular image T is defined as a rectangle on the UV plane taking an origin G (x0, y0, z0) of the UV coordinate system as the center. Further, the long side thereof is parallel to the U axis, while the short side is parallel to the V axis. The planar inclination angle φ is, as described above, an angle formed between the U axis and the J axis. Thus, in the example shown in FIG. 5, the planar inclination angle φ is a parameter indicating a rotation factor of the planar regular image T on the UV plane.

In conclusion, the position and orientation of the UV coordinate system for forming the planar regular image T shown in FIG. 4 are determined unambiguously by setting parameters made up of three angles, that is, azimuthal angle α, zenithal angle β and planar inclination angle φ. These three angles are in general referred to as Euler angles.

Figure 6:
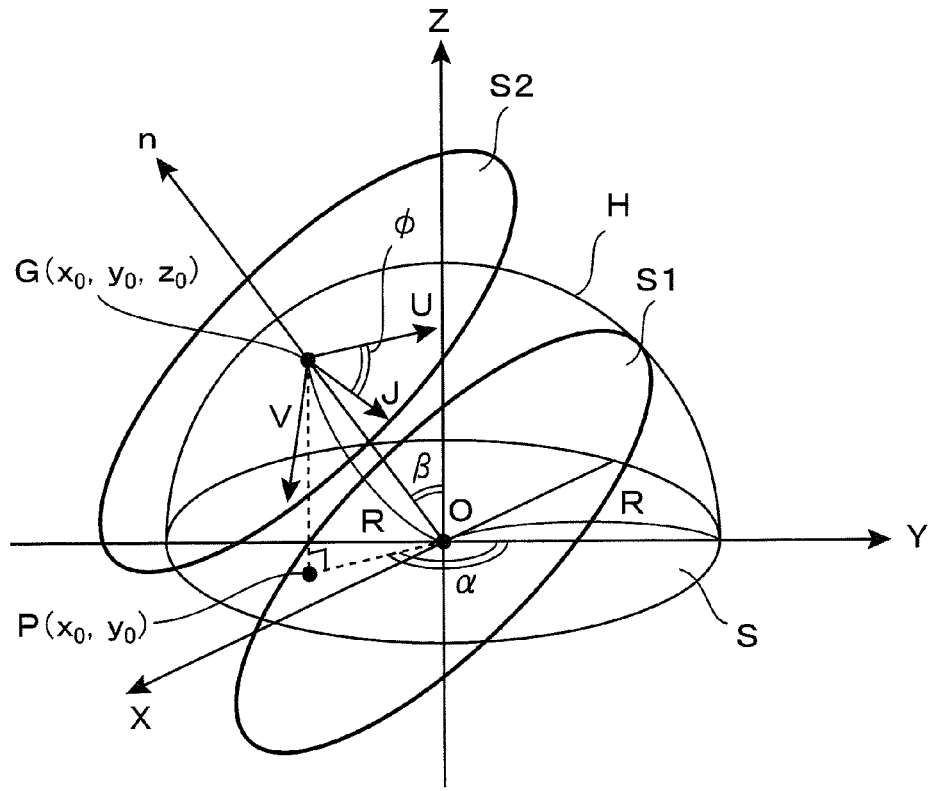
FIG. 6 is a perspective view showing a principle of coordinate conversion from the two-dimensional XY orthogonal coordinate system to the two-dimensional UV orthogonal coordinate system.

Incidentally, the image conversion to be performed in the present invention is a coordinate conversion from the XY coordinate system to the UV coordinate system. Therefore, let us take a closer look at the geometric positional relationship between the XY coordinate system and the UV coordinate system. As shown in the perspective view of FIG. 6, when the distorted circular image S on the XY plane is inclined only by the zenithal angle β with respect to a direction shown by the azimuthal angle α, an inclined face S1 is obtained. In this case, as shown in the figure, a normal vector n is defined in a direction from an origin O of the XY coordinate system to an origin G of the UV coordinate system and the inclined face S1 is subjected to parallel translation by a distance R in a direction of the visual line vector n, by which a tangent plane S2 is obtained. The movement distance R is a radius of the distorted circular image S and also a radius of a virtual sphere H.

Figure 7:
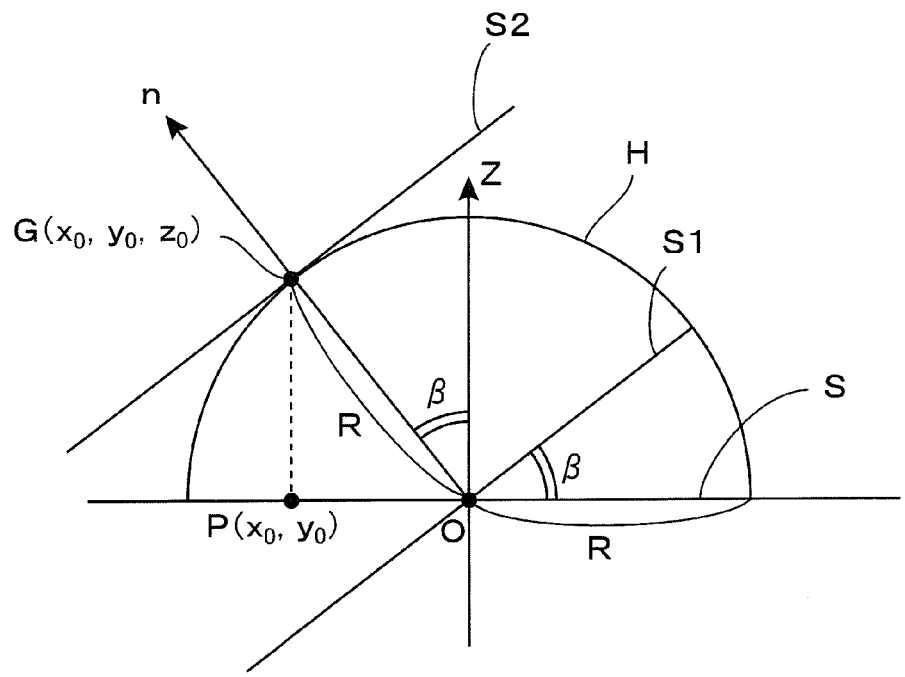
FIG. 7 is a view of individual constituents shown in the perspective view of FIG. 6, when viewed in the horizontal direction.
Figure 8:
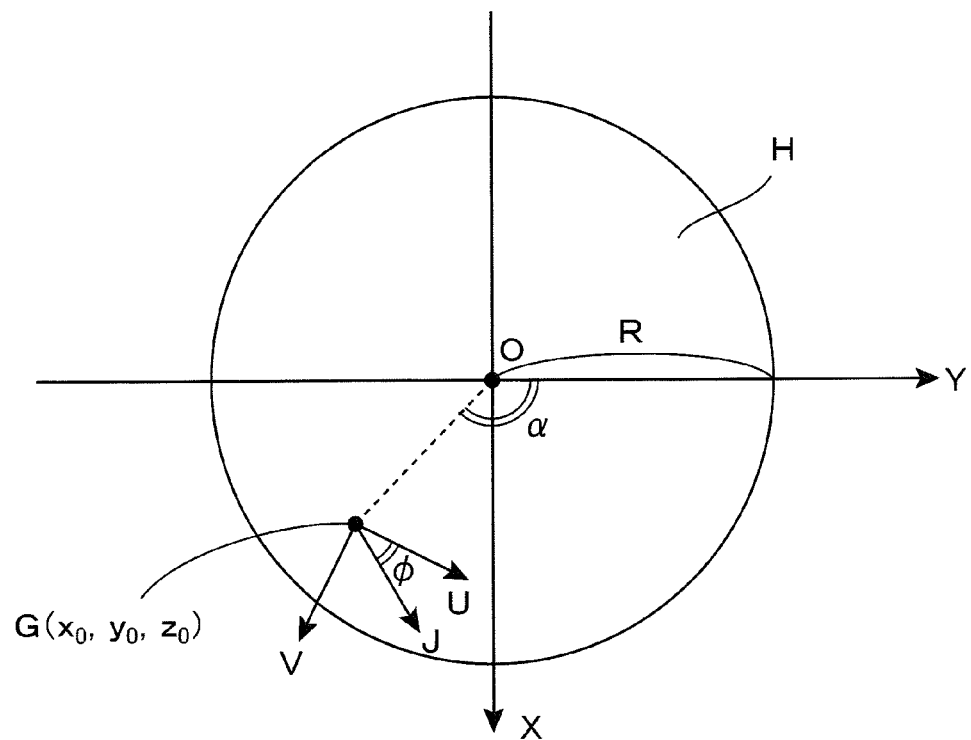
FIG. 8 is a view of individual constituents shown in the perspective view of FIG. 6, when viewed from above.

The tangent plane S2 is a plane in contact with the virtual sphere H at the point G, and the normal vector n is a vector indicating a normal line direction of the virtual sphere H at the point G. Then, the UV coordinate system is a coordinate system defined on the tangent plane S2 and a two-dimensional orthogonal coordinate system defined so that the point G is given as an origin and an angle formed between the U axis and the J axis (which is an axis passing through the point G, parallel to the XY plane, and parallel to the intersecting line between the inclined face S1 and the XY plane in the figure) is given as a planar inclination angle φ. FIG. 7 is a view of individual constituents shown in the perspective view of FIG. 6, when viewed in the horizontal direction. As described above, the point G (x0, y0, z0) is a point determined as an intersecting point between a straight line passing through a cut-out center point P (x0, y0) defined on the distorted circular image S and parallel to the Z axis and the virtual sphere H, and the position thereof is determined by the azimuthal angle α and the zenithal angle β. On the other hand, FIG. 8 is a view of individual constituents shown in the perspective view of FIG. 6, when viewed from above. The intersecting point G (x0, y0, z0) shown in the figure is a point on the virtual sphere H and positioned above the XY plane. Then, the UV coordinate system is defined on the tangent plane with respect to the virtual sphere H at the intersecting point G (x0, y0, z0). In this case, an orientation of the U axis is determined so that an angle formed between the U axis and the J axis is φ.

<<<Section 2. Basic Principle of Image Conversion, with Magnification Taken into Account>>>

In Section 1, a description was given for a basic model for defining the UV coordinate system so that an origin G (x0, y0, z0) is given as one point on the virtual sphere H. In this case, a distance between an origin O on the XY coordinate system and the origin G on the UV coordinate system is equal to a radius R. However, in most cases, a practical model is utilized in which a scaling factor is introduced into a planar regular image obtained by conversion. More specifically, a practical model is used in which a predetermined magnification m is set, the UV coordinate system is arranged at a position where a distance between two points OG is m times the radius R and a planar regular image T having a size corresponding to the magnification m is defined on the UV coordinate system. In this case, a description will be given for a basic principle of image conversion in this practical model.

Figure 9:
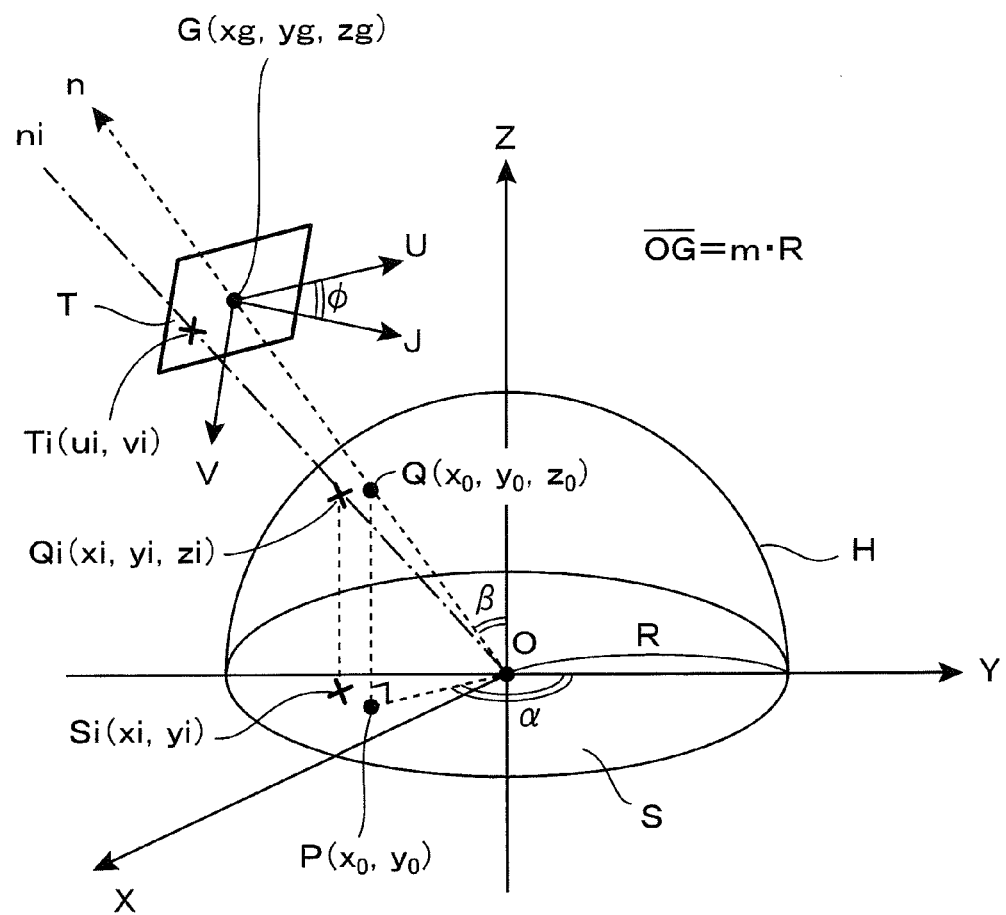
FIG. 9 is a perspective view showing a correspondence relationship between a point Si (xi, yi) on the two-dimensional XY orthogonal coordinate system and a point Ti (ui, vi) on the two-dimensional UV orthogonal coordinate system in a conventional model where a magnification m is taken into account.

FIG. 9 is a perspective view showing a correspondence relationship between a point Si (Xi, yi) on the two-dimensional XY orthogonal coordinate system and a point Ti (ui, vi) on the two-dimensional UV orthogonal coordinate system in the practical model. A difference from the basic model shown in FIG. 4 is a position of the origin G (xg, yg, zg) on the two-dimensional UV orthogonal coordinate system. More specifically, in this practical model shown in FIG. 9, a distance between two points OG is set to be m·R. FIG. 9 is an example in which m is set to be equal to 2. The basic model shown in FIG. 4 corresponds to a special example where m is set to be equal to 1 and the origin G (xg, yg, zg) is allowed to correspond to a corresponding point Q (x0, y0, z0) on the sphere in this practical model.

Herein, the corresponding point Q (x0, y0, z0) on the sphere is a point on a virtual sphere H corresponding to a cut-out center point P (x0, y0). In the case of a fisheye lens based on the orthogonal projection method, the corresponding point Q is a point defined as an intersecting point between a straight line passing through the cut-out center point P (x0, y0) and parallel to the Z axis and the virtual sphere H. Since a visual line vector n is defined as a vector extending from the origin O to the corresponding point Q (x0, y0, z0) on the sphere, setting the cut-out center point P (x0, y0) is equal in meaning to setting the visual line vector n.

As a matter of course, in the practical model shown in FIG. 9 as well, the origin G (xg, yg, zg) on the two-dimensional UV orthogonal coordinate system is a point on the visual line vector n, and the UV coordinate system is defined on a plane orthogonal to the visual line vector n. Further, an orientation of the U axis is determined on the basis of the planar inclination angle φ. More specifically, as illustrated, an orientation of the UV coordinate system is determined so that an angle formed between the rotational reference axis J passing through the origin G (xg, yg, zg) and the U axis is in alignment with the planar inclination angle φ.

An object of the image conversion performed here is to cut out a distorted image inside a cut-out region taking the cut-out center point P (x0, y0) as the center on a distorted circular image S defined on the XY coordinate system and deform the image, thereby obtaining a planar regular image T on the UV coordinate system. More specifically, a pixel value of a pixel positioned at one point Ti (ui, vi) on the planar regular image T on the UV coordinate system is determined on the basis of a pixel value of a pixel positioned in the vicinity of one point Si (xi, yi) on the XY coordinate system corresponding thereto. For this reason, as will be described in Section 3, correspondence relationship equations showing a correspondence relationship between coordinates (ui, vi) and coordinates (xi, yi) are required.

In performing the above-described image conversion, the visual line vector n functions as a parameter indicating a cut-out position of a planar regular image. Where the visual line vector n is set in the illustrated direction, the planar regular image is to be cut out from the inside of a cut-out region taking the cut-out center point P (x0, y0) as the center. Changing the direction of the visual line vector n changes the position of the cut-out center point P, by which the position at which the planar regular image is cut out changes. On the other hand, the planar inclination angle φ functions as a parameter indicating a cut-out orientation of the planar regular image, and the magnification m (a factor of determining a distance between two points OG) functions as a parameter indicating a cut-out size of the planar regular image.

Figure 10:
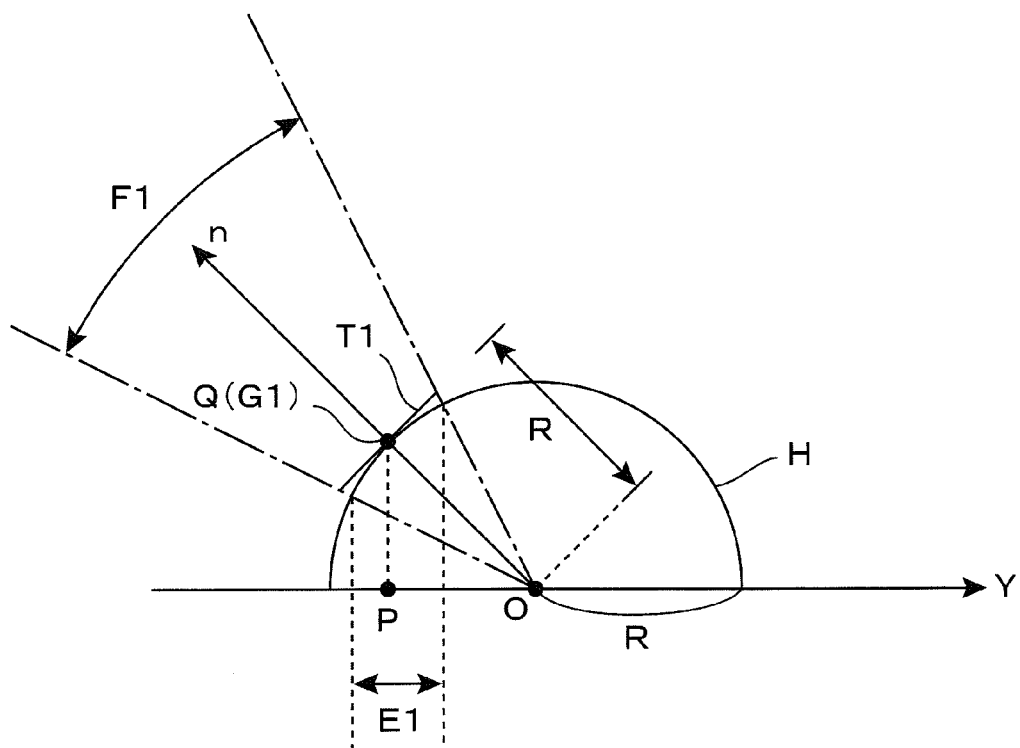
FIG. 10 is a side elevational view showing an arrangement of the two-dimensional UV orthogonal coordinate system and a range of a cut-out region E1 when the magnification m is set to be equal to 1.
Figure 11:
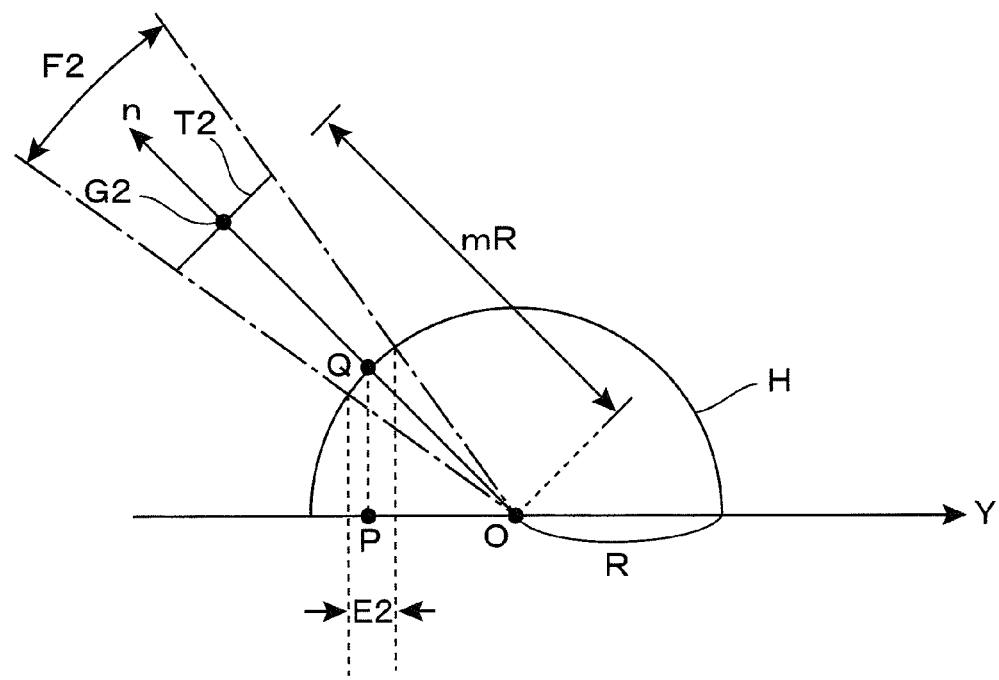
FIG. 11 is a side elevational view showing an arrangement of the two-dimensional UV orthogonal coordinate system and a range of the cut-out region E2 when the magnification m is set to be greater than 1

FIG. 10 and FIG. 11 are side elevational views showing a relationship between the magnification m and the cut-out region E. FIG. 10 corresponds to a model in which the magnification m is set to be equal to 1 (the model shown in FIG. 4), and the corresponding point Q on the sphere positioned immediately above the cut-out center point P is given as an origin G1 of the UV coordinate system, as it is, and a distance between two points O and G1 is equal to the radius R. On the other hand, FIG. 11 corresponds to a model in which the magnification m is set to be greater than 1 (the model shown in FIG. 9), and an origin G2 of the UV coordinate system is set at a position away from the corresponding point Q on the sphere immediately above the cut-out center point P, and a distance between two points O and G2 is equal to m times the radius R. They are both the same in the position of the cut-out center point P, the position of the corresponding point Q on the sphere, and the position of the visual line vector n. However, since they are different in positions of the origins G1 and G2, they are accordingly different in the position of the UV coordinate system (positions of planar regular images T1 and T2 formed thereon).

A comparison of FIG. 10 with FIG. 11 will make it clear that a cut-out region E varies depending on a magnification m. More specifically, where the magnification m is set to be equal to 1, as shown in FIG. 10, E1 is given as a cut-out region. However, where the magnification m is set to be greater than 1, as shown in FIG. 11, E2 is given as a cut-out region, the greater the magnification m is, the smaller an area of the cut-out region E is. In this case, where the thus obtained planar regular images T1 and T2 are displayed on a screen of a monitoring device, the planar regular images T1 and T2 are constant in dimension (to be determined according to the dimension of a monitor screen). Therefore, although the planar regular images T1 and T2 are both images cut out taking the cut-out center point P as the center, the planar regular image T2 at which the magnification m is set to be greater than 1 is an image which displays a narrower cut-out region E2 in an enlarged manner. In other words, the planar regular image T1 is an image at which a photographic subject inside a field angle F1 is photographed, while the planar regular image T2 is an image at which a photographic subject inside a narrower field angle F2 is photographed.

On the other hand, the planar inclination angle φ is a parameter indicating a cut-out orientation of a planar regular image. Changing the planar inclination angle φ changes the positional relationship with an image frame of a photographic subject appearing inside the planar regular image (positional relationship with respect to a rotational direction). This will be easily understood from the fact that as shown in FIG. 5, an increase in the angle φ results in a counterclockwise rotation of the U axis (and the V axis) and also a counterclockwise rotation of the image frame of the planar regular image T.

In conclusion, a user is able to obtain a desired planar regular image T on the UV coordinate system by setting three parameters, that is, a visual line vector n (cut-out center point P), a magnification m and a planar inclination angle φ. Further, where the thus obtained planar regular image T is not satisfactory, by appropriately adjusting these three parameters, the planar regular image T can be adjusted. More specifically, if the user is not satisfied with an orientation of the thus obtained image, the user may adjust the planar inclination angle φ. If not satisfied with a field angle of the obtained image, the user may adjust the magnification m, and if not satisfied with a cut-out position of the obtained image, the user may adjust the visual line vector n (cut-out center point P).

Figure 12:
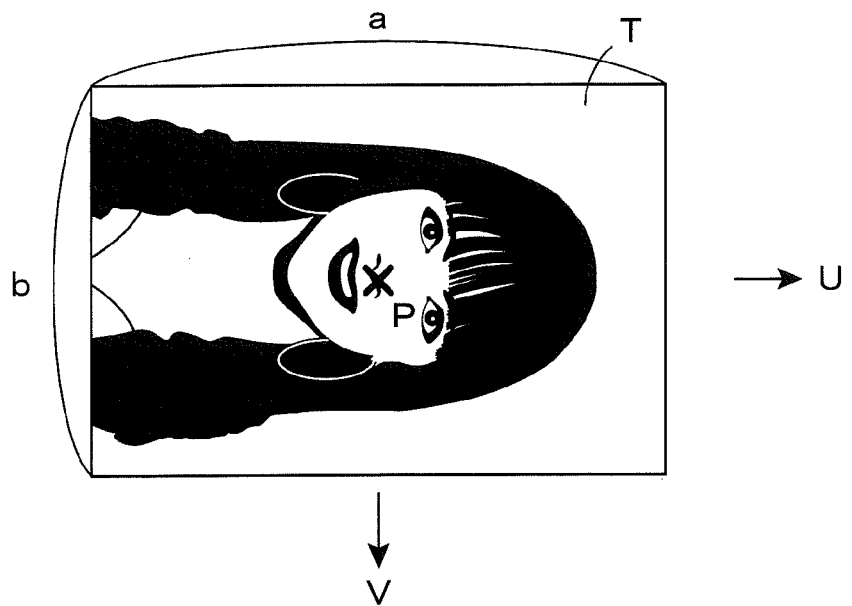
FIG. 12 is a plan view showing one example of the planar regular image T obtained on the two-dimensional UV orthogonal coordinate system by cutting out a part of the distorted circular image S shown in FIG. 2.

FIG. 12 is a plan view showing one example of the planar regular image T obtained on the UV coordinate system by appropriately setting the above-described three parameters, in the distorted circular image S illustrated in FIG. 2, cutting out a part of the image and converting it. In this example, a position of the nose of a woman in the distorted circular image S shown in FIG. 2 is set as a cut-out center point P, and an image around the face of the woman is cut out. However, a cut-out orientation is set so that the height direction of the woman is given as the U axis, and therefore, as illustrated, when the image is displayed on the monitor screen in which the U axis is taken in the horizontal direction, the woman is displayed, with the face turned in a transverse direction.

In this case, a user may adjust the planar inclination angle φ. For example, when the angle φ is decreased by approximately 90 degrees, the U axis (and the V axis) are rotated clockwise, and the image frame of the planar regular image T is also rotated clockwise, thereby obtaining an upright image of the woman. However, since the illustrated monitor screen is provided with a rectangular frame which is smaller in the vertical dimension b (the number of pixels in the perpendicular direction) than in the transverse dimension a (the number of pixels in the horizontal direction), it is necessary to adjust the magnification m to some extent in order to display an area below the neck of the woman.

Figure 13:
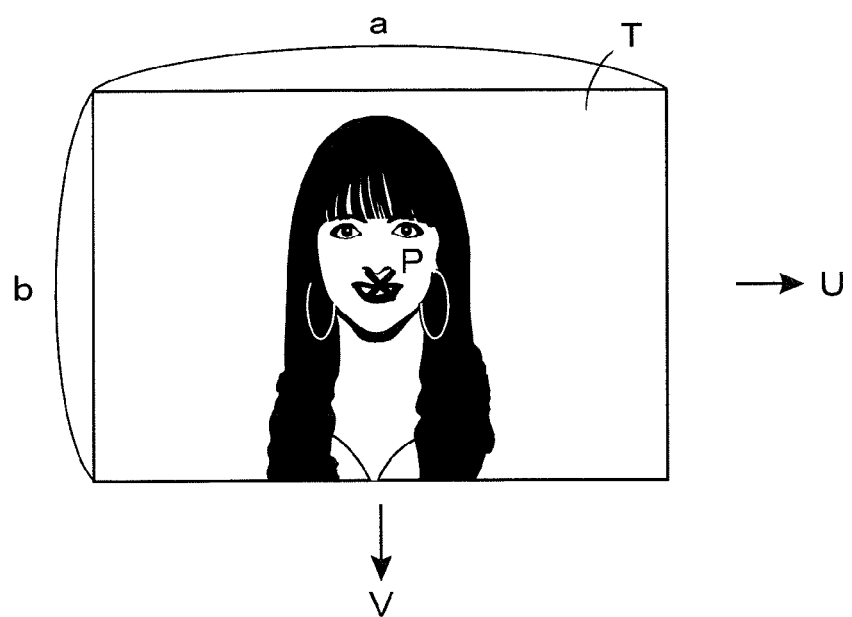
FIG. 13 is a plan view showing another example of the planar regular image T obtained on the two-dimensional UV orthogonal coordinate system by cutting out a part of the distorted circular image S shown in FIG. 2.

FIG. 13 shows a planar regular image T obtained after the above-described adjustment. An upright image of the woman which covers an area below the neck is obtained as desired by a user. Both in FIG. 12 and FIG. 13, the visual line vector n (cut-out center point P) is set in the same manner. Both images are those in which a designated cut-out center point P is centered at the position of the nose of the woman. However, in these images, the UV coordinate system to be defined is different in position and orientation, and the planar regular images T to be obtained are consequently different.

It is noted that "the planar regular image" described in the present application does not necessarily mean "a perfect image free of any distortion" but means "a planar image which is closer to an image photographed by use of an ordinary lens than a distorted circular image S photographed by use of a fisheye lens." Therefore, as compared with the image of the woman on the distorted circular image S shown in FIG. 2, the planar regular images T shown in FIG. 12 and FIG. 13 appear to be free of distortion but distortion is not completely removed. In reality, a planar regular image obtained by conventional image conversion is inadequate in correcting distortion for an application to confirm detailed features of a person, and, in particular, the image is relatively greatly distorted at an external part thereof (in the vicinity of the contour).

<<<Section 3. Correspondence Relationship Equations of Orthogonal Projection Method>>>

Figure 14:
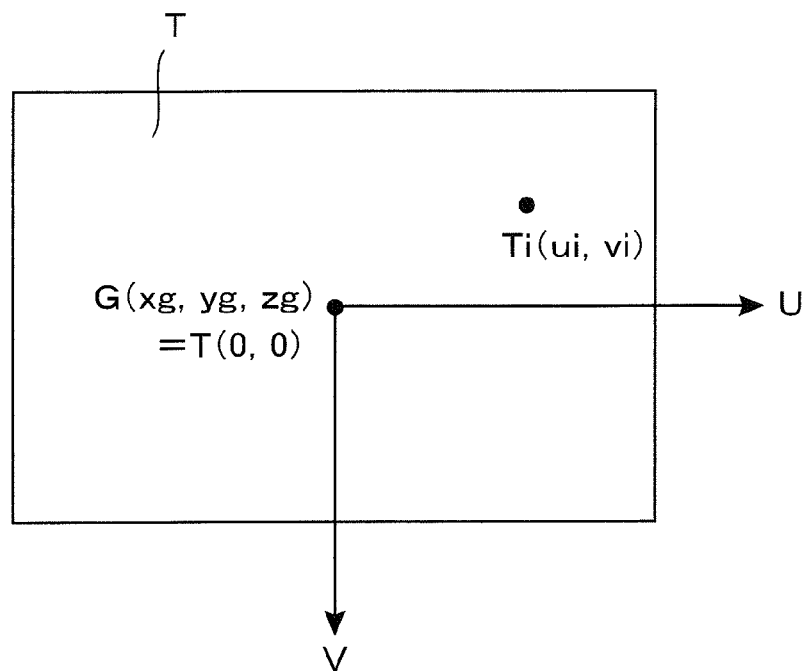
FIG. 14 is a plan view showing the planar regular image T defined on the two-dimensional UV orthogonal coordinate system.

FIG. 14 is a plan view showing a planar regular image T defined on the two-dimensional UV orthogonal coordinate system. Herein, any given point Ti on the planar regular image T is expressed as Ti (ui, vi) by using coordinate values ui and vi of the UV coordinate system. As shown in FIG. 9, an origin G of the UV coordinate system is indicated as a point G (xg, yg, zg) by using coordinates on a three-dimensional XYZ orthogonal coordinate system. However, the origin G is indicated as a point T (0,0) as shown in FIG. 14, when indicated by using a two-dimensional UV orthogonal coordinate system.

Figure 15:
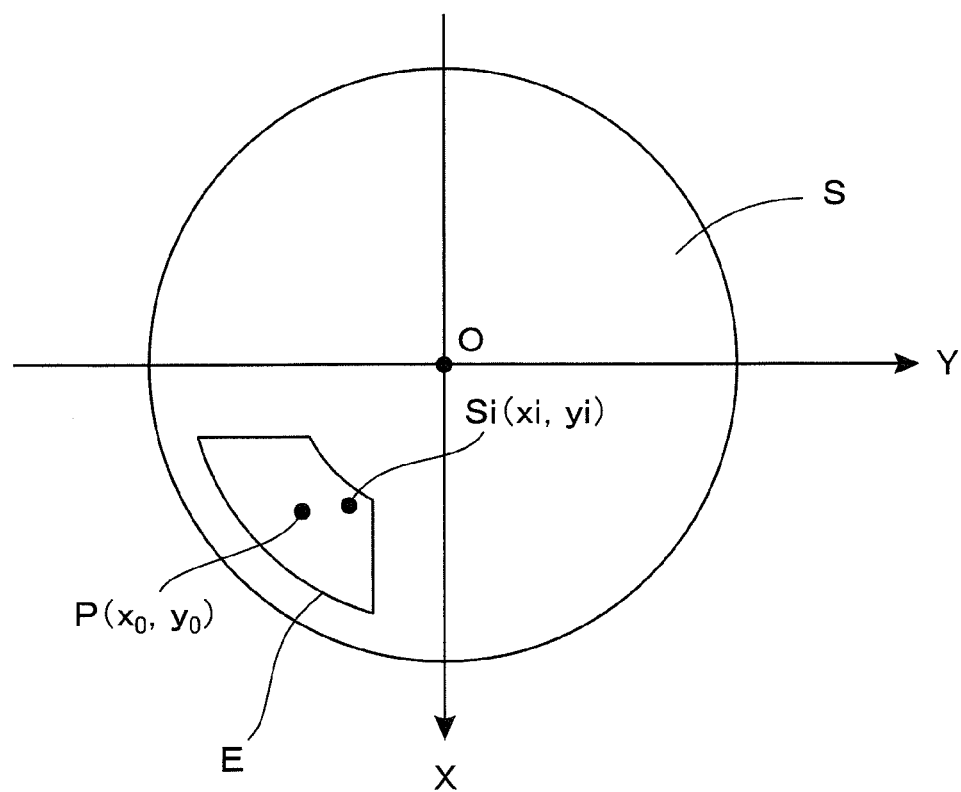
FIG. 15 is a plan view showing the distorted circular image S defined on the two-dimensional XY orthogonal coordinate system.

On the other hand, FIG. 15 is a plan view showing a distorted circular image S defined on the two-dimensional XY orthogonal coordinate system. Here, any given point Si on the distorted circular image S is expressed as Si (xi, yi) by using coordinate values xi and yi of the XY coordinate system. An image on the origin G (point T (0,0)) shown in FIG. 14 corresponds to an image on the cut-out center point P (x0, y0) shown in FIG. 15, and an image on any given point Ti (ui, vi) shown in FIG. 14 corresponds to an image on the point Si (xi, yi) shown in FIG. 15.

As described above, in order to obtain the planar regular image T on the two-dimensional UV orthogonal coordinate system, it is necessary to determine a pixel value of a pixel positioned at the point Ti (ui, vi) shown in FIG. 14 on the basis of a pixel value of a pixel (a pixel inside the distorted circular image S on the two-dimensional XY orthogonal coordinate system) positioned at the point Si (xi, yi) shown in FIG. 15. Therefore, a correspondence relationship equation is required showing a one-for-one correspondence relationship between coordinates (ui, vi) on the two-dimensional UV orthogonal coordinate system and coordinates (xi, yi) on the two-dimensional XY orthogonal coordinate system. Use of the above correspondence relationship equation allows any given point on the planar regular image T shown in FIG. 14 to correspond to any point inside the cut-out region E of the distorted circular image S shown in FIG. 15, thus making it possible to convert a distorted image inside the cut-out region E into the planar regular image T.

The above-described correspondence relationship equation can be determined unambiguously by a geometrical method, when the UV coordinate system arranged inside a space of the three-dimensional XYZ coordinate system is determined for the position and orientation. For example, in the example shown in FIG. 9, when attention is paid to a positional relationship between a point Ti (ui, vi) on the planar regular image T and a point Si (xi, yi) on the distorted circular image S to give a point on the virtual sphere H immediately above the point Si (xi, yi) as a corresponding point Qi (xi, yi, zi) on the sphere, the point Ti (ui, vi) is to position at an intersecting point between a straight line ni connecting an origin O with a corresponding point Qi on the sphere and the coordinates plane of the UV coordinate system.

Figure 16:
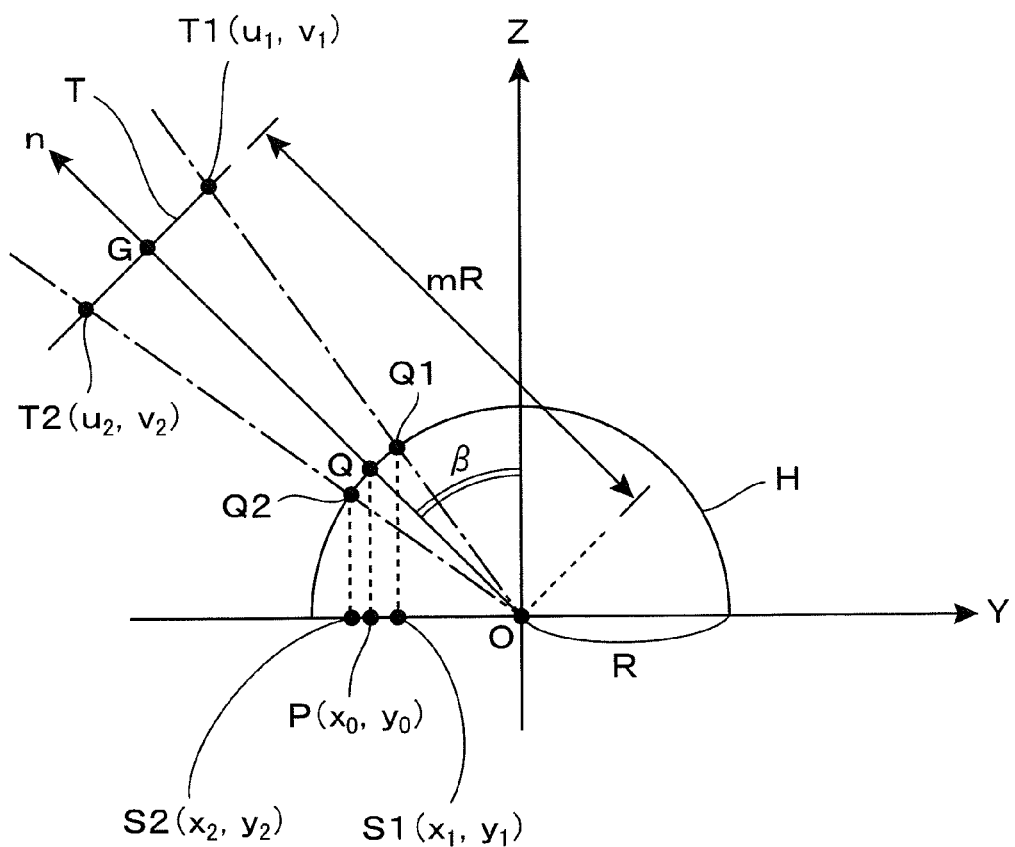
FIG. 16 is a side elevational view of a virtual sphere showing a correspondence relationship between points S1 (x1, y1) and S2 (x2, y2) on the two-dimensional XY orthogonal coordinate system and points T1 (u1, v1) and T2 (u2, v2) on the two-dimensional UV orthogonal coordinate system.

FIG. 16 is a side elevational view for describing more clearly a positional relationship between these two points. In FIG. 16, a visual line vector n extends from an origin O in a direction having a zenithal angle β, and an intersecting point Q between the visual line vector n and a virtual sphere H is positioned immediately above a cut-out center point P (x0, y0). Further, a point G is defined at a position where the distance from the origin O is mR on the visual line vector. This point G is an origin of the two-dimensional UV orthogonal coordinate system, and the coordinate plane of the UV coordinate system is orthogonal to the visual line vector n. And the planar regular image T is defined on the coordinate plane of the UV coordinate system.

A corresponding point S1 (x1, y1) on the distorted circular image S with regard to any given point T1 (u1, v1) on the planar regular image T is defined as follows. More specifically, a corresponding point Q1 on the sphere is determined at a position of an intersecting point between a straight line connecting the point T1 (u1, v1) with an origin O and a virtual sphere H, and a point on the distorted circular image S at a position immediately below the corresponding point Q1 on the sphere may be given as the corresponding point S1 (x1, y1). Similarly, any given point T2 (u2, v2) on the planar regular image T is defined by processes in which a corresponding point Q2 on the sphere at a position of an intersecting point between a straight line connecting a point T2 (u2, v2) with the origin O and the virtual sphere H is determined to give a point on the distorted circular image S immediately below the corresponding point Q2 on the sphere as a corresponding point S2 (x2, y2).

A correspondence relationship between these two points can be described by geometrical correspondence relationship equations. More specifically, it is known that the relationship can be described by equations (1) to (9) shown in FIG. 17. For example, the above-described Patent Documents 1 and 2 have disclosed image conversion using these correspondence relationship equations. It is noted that since there is a slight difference in reference numerals and others in individual items depending on how to define a way of taking coordinate systems and an angle, there is found a small difference in equations described depending on documents. However, they are fundamentally equations showing the same geometric operation.

The correspondence relationship equations shown in FIG. 17 are those in which the coordinate system and angles shown in FIG. 9 are defined, including parameters α, β indicating a position of the UV coordinate system and a parameter φ indicating an orientation of the UV coordinate system. These three parameters indicate the previously described Euler angles, that is, an azimuthal angle α, a zenithal angle β and a planar inclination angle φ.

More specifically, the following equation:

$$x = R(uA + vB + wC)/\sqrt{(u^2 + v^2 + w^2)} \qquad \text{Equation (1)}$$

is to determine an x-coordinate value of the corresponding point S (x, y) on the XY coordinate system by using coordinate values u and v at one point T(u, v) on the UV coordinate system. A, B and C are values respectively determined by the following mathematical equations:

$$A = \cos\phi \cos\alpha - \sin\phi \sin\alpha \cos\beta \qquad \text{Equation (3)}$$

$$B = -\sin\phi \cos\alpha - \cos\phi \sin\alpha \cos\beta \qquad \text{Equation (4)}$$

$$C = \sin\beta \sin\alpha \qquad \text{Equation (5).}$$

They are determined by operation by use of trigonometric functions of Euler angles α, β, φ.

In a similar manner, the following equation:

$$y = R(uD + vE + wF)/\sqrt{(u^2 + v^2 + w^2)} \qquad \text{Equation (2)}$$

is to determine a y-coordinate value of the corresponding point S (x, y) on the XY coordinate system by use of coordinate values u, v at one point T(u, v) on the UV coordinate system. D, E and F are values respectively determined by the following mathematical equations:

$$D = \cos\phi \sin\alpha + \sin\phi \cos\alpha \cos\beta \qquad \text{Equation (6)}$$

$$E = -\sin\phi \sin\alpha + \cos\phi \cos\alpha \cos\beta \qquad \text{Equation (7)}$$

$$F = -\sin\beta \cos\alpha \qquad \text{Equation (8).}$$

They are determined by operation by use of trigonometric functions of Euler angles α, β, φ.

It is noted that w in the equations (1) and (2) is a value given by the following equation:

$$w = mR \qquad \text{Equation (9)}$$

wherein R is a radius of the distorted circular image S as described above, and m is a magnification. The magnification m indicates a relationship between the scaling of coordinate values u, v and the scaling of coordinate values x, y. The greater the setting of the magnification m, the greater an enlarged image is required for a planar regular image T. However, the cut-out region E of the distorted circular image S is made smaller.

In conclusion, in the equation shown in FIG. 17, a value of R is already known as a radius of the distorted circular image S, and a value of m is also known as a magnification designated by a user. Thus, when the user designates Euler angles α, β, φ by which upon determination of the position and orientation of the UV coordinate system, unknown values for calculating the coordinate values x, y will be only u, v in the correspondence relationship equation shown in FIG. 17. Therefore, this correspondence relationship equation can be used to determine a corresponding point S (x, y) on the distorted circular image S which corresponds to any given one point T (u, v) on the planar regular image T.

Figure 18:
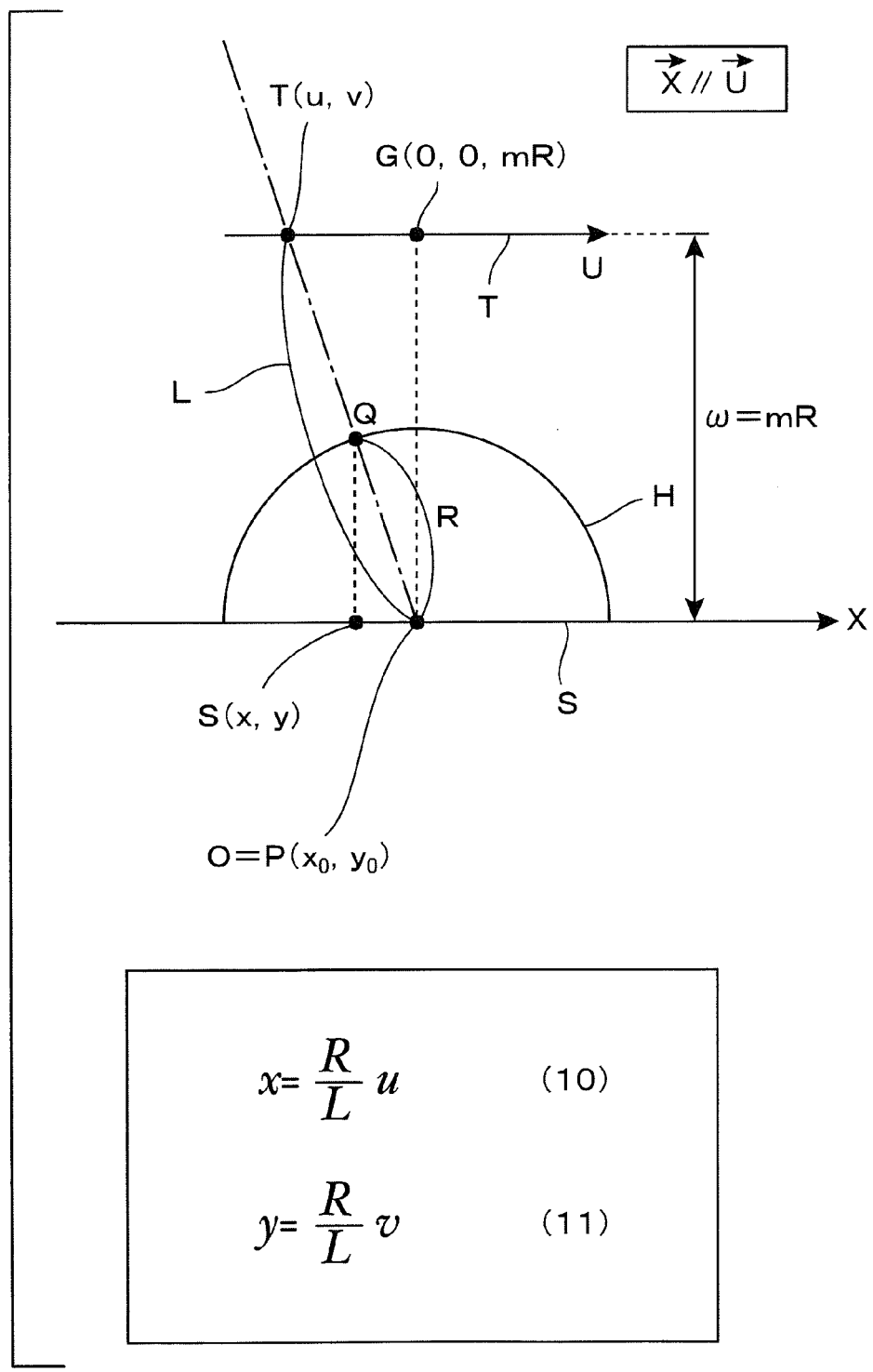
FIG. 18 is a view for describing the meaning of the correspondence relationship equations shown in FIG. 17.

FIG. 18 is a view for briefly describing the meaning of the correspondence relationship equation shown in FIG. 17. FIG. 18 indicates a position of the UV coordinate system in a special case where a cut-out center point P (x0, y0) is set at a position of an origin O of the three-dimensional XYZ orthogonal coordinate system. In this case, an azimuthal angle α is set to be equal to 0 degrees, a zenithal angle β is set to be equal to 0 degrees, and a visual line vector n is oriented immediately above (in the positive direction of the Z axis). Further, the origin G of the UV coordinate system is arranged on the Z axis, coordinates on the three-dimensional XYZ orthogonal coordinate system are given as G (0, 0, mR), and the UV coordinate plane (a plane of forming the planar regular image T) is a plane parallel to an XY plane. In this case, where the planar inclination angle φ is set to be equal to 0 degrees, the X axis is parallel to the U axis, while the Y axis is parallel to the V axis.

Under the above-described special condition, a positional relationship between any given point T (u, v) on the planar regular image T and the corresponding point S (x, y) on the distorted circular image S will be as illustrated. More specifically, a point Q on the virtual sphere H immediately above the point S (x, y) is determined and an intersecting point between a straight line connecting two points OQ and the coordinate plane of the UV coordinate system is determined, thereby providing a relationship in which the intersecting point concerned is given as a point T (u, v). Therefore, the following simple correspondence relationship equations are obtained between the coordinates (x, y) and coordinates (u, v).

$$x = (R/L) \cdot u \qquad \text{Equation (10)}$$

$$y = (R/L) \cdot v \qquad \text{Equation (11)}$$

The equations (1) and (2) shown in FIG. 17 are nothing but equations that are obtained by correcting the equations (10) and (11) by use of a rotation factor regulated by an azimuthal angle α, a zenithal angle β and a planar inclination angle φ. A denominator $\sqrt{(u^2 + v^2 + w^2)}$ of the equations (1), (2) corresponds to an L in the equations (10), (11). As shown in FIG. 18, the L is a distance between the origin O and the point T (u, v), giving $L = \sqrt{(u^2 + v^2 + w^2)}$. On the other hand, numerators (uA+vB+wC) and (uD+vE+wF) of the equations (1) and (2) are correction terms by a rotation factor. In this case, A to F are referred to as a rotational coefficient. The rotational coefficients A to F are, as shown in the equations (3) to (8) in FIG. 17, coefficients indicated by an operational equation using trigonometric functions of Euler angles α, β, φ.

The image conversion method disclosed in the above-described Patent Documents 1, 2 and others is to convert a part of the distorted circular image S into the planar regular image T by use of the correspondence relationship equations shown in FIG. 17. However, the planar regular image T obtained by transformation based on the above-described correspondence relationship equations is distorted and inadequate for an application to confirm detailed features of a person. As already described, the planar regular image T is greatly distorted at an external part thereof (in the vicinity of the contour), and where horizontal panning is performed, a smooth panning image cannot be obtained.

<<<Section 4. Basic Concept of the Present Invention>>>

The present invention is to present a new conversion method for solving the above problems. Here, a description will be given for the basic concept with reference to FIG. 19.

Figure 19:
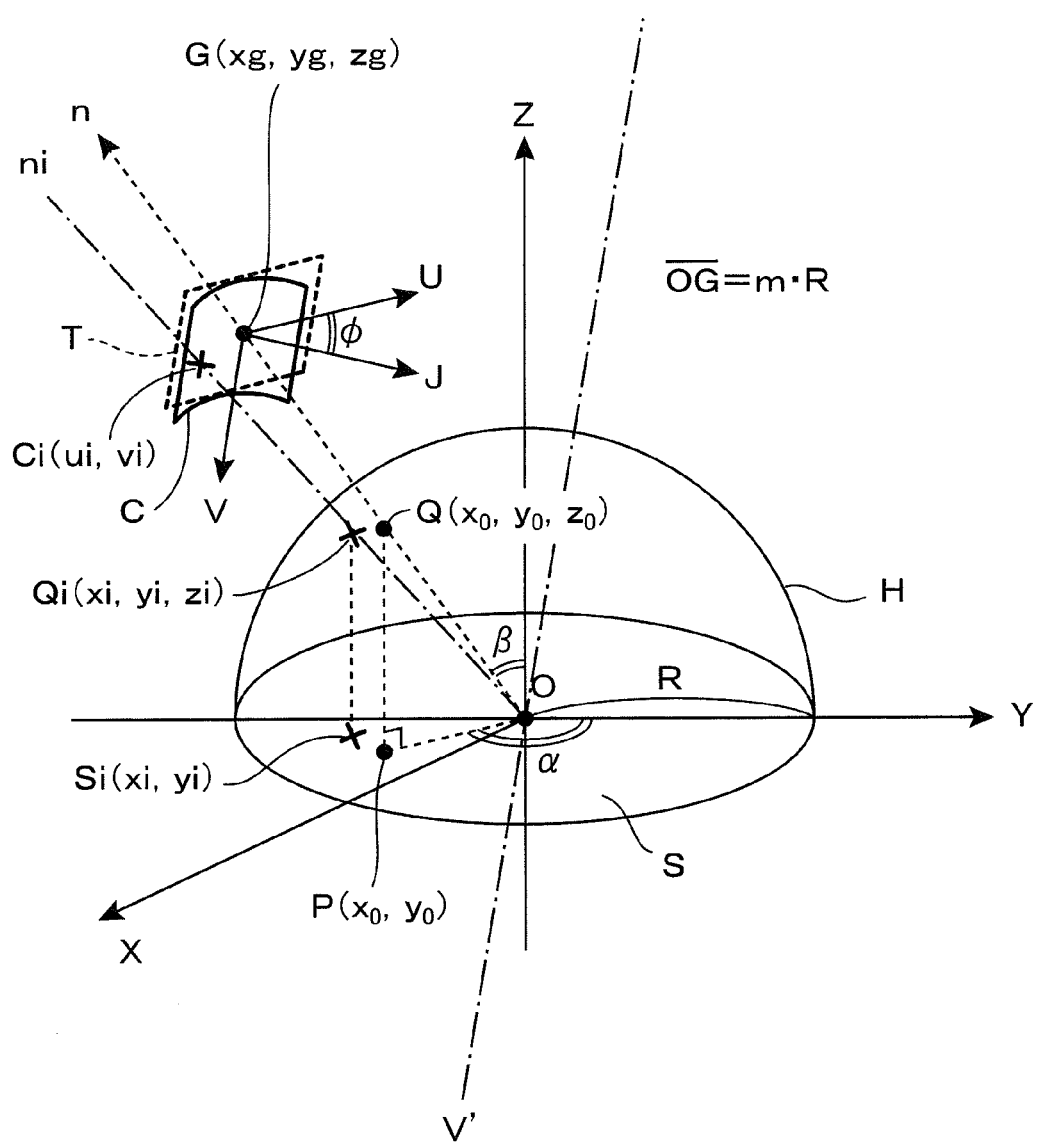
FIG. 19 is a perspective view showing a correspondence relationship between a point Si (xi, yi) on the two-dimensional XY orthogonal coordinate system and a point Ci (ui, vi) on the two-dimensional UV curved coordinate system.

FIG. 19 is a perspective view showing the model of the present invention in which the practical model shown in FIG. 9 described in Section 2 is adjusted. These two models are only different in definition of the UV coordinate system. More specifically, in the model shown in FIG. 9, the UV coordinate system is defined on a plane passing through a point G (xg, yg, zg) and orthogonal to a visual line vector n. However, in the model of FIG. 19, the UV coordinate system defined on the plane is curved along the side face of a cylindrical column. Therefore, in the model of FIG. 9, the planar regular image T is obtained on a two-dimensional UV orthogonal coordinate system (a coordinate system on the plane), while in the model of FIG. 19, a curved regular image C on a two-dimensional UV curved coordinate system (coordinate system on the side face of the cylindrical column) is obtained.

The planar regular image T indicated by the broken line in FIG. 19 is the same as the planar regular image T indicated by the solid line in FIG. 9, that is, an image on the two-dimensional UV orthogonal coordinate system defined on a plane passing through a point G (xg, yg, zg) and orthogonal to the visual line vector n. On the other hand, the curved regular image C indicated by the solid line in FIG. 19 corresponds to an image in which the planar regular image T is curved, that is, an image on a curved face along the side face of the cylindrical column.

In other words, the two-dimensional UV curved coordinate system defined by the model shown in FIG. 19 is a coordinate system arranged on a curved face along the side face of a virtual cylindrical column at a desired position inside a space constituting the three-dimensional XYZ orthogonal coordinate system, and the curved regular image C defined on the curved coordinate system is also an image curved along the side face of the virtual cylindrical column.

Since the two-dimensional UV curved coordinate system is also a two-dimensional coordinate system having the U axis and the V axis, a point at which any given one point inside the curved regular image C is indicated by coordinates (u, v) is the same as in the case of an ordinary two-dimensional coordinate system on a plane. As described above, the two-dimensional UV curved coordinate system is a coordinate system defined by giving a point G as an origin and curving the two-dimensional UV orthogonal coordinate system arranged on a plane orthogonal to a visual line vector n along the side face of the virtual cylindrical column. Some conditions are, however, imposed on this curving process.

First, the virtual cylindrical column used in the curving process is to be a cylindrical column having a central axis parallel to the V axis of the two-dimensional UV orthogonal coordinate system. In particular, in the present embodiment, used is a virtual cylindrical column, the radius of which is equal to mR (a distance between points OG). Then, the virtual cylindrical column is arranged so that the point G is positioned on the side face thereof. In conclusion, when a virtual cylindrical column that can satisfy these conditions is arranged on the three-dimensional XYZ orthogonal coordinate system, the central axis of the virtual cylindrical column is, as shown by the single dotted and dashed line in FIG. 19, given as the axis V' passing through an origin O, and a segment connecting two points OG is to constitute a radius of the virtual cylindrical column.

This curving process will be described by using an actual object in a metaphorical manner as follows. First, as shown in FIG. 14, a rectangular slip of paper in which the U axis is depicted in the transverse direction and the V axis is depicted in the vertical direction is prepared. The surface of the rectangular slip of paper corresponds to a coordinate plane of the two-dimensional UV orthogonal coordinate system. In this case, since both the U axis and the V axis are coordinate axes, a predetermined coordinate graduation is engraved on these axes, and coordinates at the center point of the slip of paper (an intersecting point between both the axes) are T (0,0). This slip of paper is arranged in such a manner that the center point T (0,0) is positioned at a point G (xg, yg, zg) of the three-dimensional XYZ orthogonal coordinate system. The slip of paper is still kept in a planar state and arranged in an orientation orthogonal to a visual line vector n. Further, as shown in FIG. 19, the U axis depicted on the slip of paper is arranged so as to give a planar inclination angle $\phi$ with respect to the rotational reference axis J.

Next, a cylindrical column having a radius mR is prepared and the cylindrical column is arranged so that the central axis is positioned on the axis V'. In this case, the axis V' is a straight line parallel to the V axis depicted on the slip of paper and passing through the origin O. When the cylindrical column is arranged as positioned above, the V axis depicted on the slip of paper is kept in contact with the side face of the cylindrical column. As a matter of course, the center point T (0,0) of the slip of paper, that is, a point G (xg, yg, zg), is also a point in contact with the side face of the cylindrical column. In this case, this slip of paper is curved so as to roll around the side face of the cylindrical column and pasted on the side face of the cylindrical column, as it is. Thereby, the coordinate system depicted on the curved slip of paper is to be a two-dimensional UV curved coordinate system.

In conclusion, the V axis of the two-dimensional UV curved coordinate system is exactly the same as the V axis of the two-dimensional UV orthogonal coordinate system and given as a straight-line coordinate axis. However, the U axis of the two-dimensional UV curved coordinate system is a circular-arc axis along the side face of the cylindrical column. In other words, the two-dimensional UV curved coordinate system is constituted with the V axis parallel to the central axis V' of the virtual cylindrical column and the circular-arc U axis along the circumference of a circle constituting a cross section when the virtual cylindrical column is cut by a face orthogonal to the V axis. As a matter of course, a coordinate graduation engraved on the U axis is to be a graduation defined along the circular arc.

Now, a principle of obtaining the curved regular image C on the two-dimensional UV curved coordinate system is completely identical with a principle of obtaining the planar regular image T on the two-dimensional UV orthogonal coordinate system. More specifically, one point Ci (ui, vi) on the curved regular image C is allowed to correspond to one point Si (xi, yi) on the distorted circular image S, by which a pixel value of a pixel positioned at the point Ci (ui, vi) may be determined on the basis of a pixel value of a pixel positioned in the vicinity of the point Si (xi, yi). For this reason, a one-for-one correspondence relationship equation is required which allows any given coordinates (u, v) on the two-dimensional UV curved coordinate system to correspond to corresponding coordinates (x, y) on an XY plane. As will be described in detail in Section 5, the correspondence relationship equation is obtainable by correcting the correspondence relationship equations shown in FIG. 17.

As described above, after the curved regular image C constituted with an aggregate of many pixels is obtained on the two-dimensional UV curved coordinate system, the two-dimensional UV curved coordinate system is expanded on a plane, by which the curved regular image C may be converted into the planar regular image T. The expansion on the plane may be taken as a work for peeling off a slip of paper pasted on the side face of a cylindrical column and pasting it again on the plane in the above-described example.

However, the expansion on the plane will not need any specific work in terms of operation. Pixels (pixels constituting the curved regular image C) positioned at coordinates (u, v) on the two-dimensional UV curved coordinate system are, pixels located at the same coordinates (u, v), even if they are given as pixels (pixels constituting the planar regular image T) on the two-dimensional UV orthogonal coordinate system by the expansion on the plane. Therefore, where pixel array data showing pixel values of many pixels located at predetermined coordinates (u, v) on the two-dimensional UV curved coordinate system is obtained, the pixel array data is output, as it is, as pixel array data on the two-dimensional UV orthogonal coordinate system and an image is displayed on an ordinary monitor screen (a planar screen). Thereby, the planar regular image T after the expansion on the plane is to be displayed on a monitor screen.

As described above, the pixel array data obtained for displaying the curved regular image C on the two-dimensional UV curved coordinate system which is originally to give a side wall of the cylindrical column is used to display an image on an ordinary monitor screen (a screen on the plane) having the two-dimensional UV orthogonal coordinate system. This processing corresponds to the work in which, in the above-described example, a slip of paper pasted on the side wall of the cylindrical column is peeled off and again pasted on the plane. The display screen will be changed from the side face of the cylindrical column to the plane, but no change is needed for the pixel array data itself.

In conclusion, in the present invention, adopted is a method in which, in place of obtaining the planar regular image T on the two-dimensional UV orthogonal coordinate system, the curved regular image C is obtained on the two-dimensional UV curved coordinate system defined on the side face of the cylindrical column, and pixel array data showing the curved regular image C is used to display an image on an ordinary monitor screen (a planner screen). Thereby, the planar regular image T is finally obtained on the monitor screen.

On the basis of the above-described basic principle, a part of a distorted circular image photographed by use of a fisheye lens is cut out and converted into a planar regular image. This conversion may be made by conducting the following processes.

First, performed is an image preparation step in which the distorted circular image S constituted with an aggregate of many pixels arranged at a position indicated by coordinates (x, y) on the two-dimensional XY orthogonal coordinate system and having a radius R at the center of an origin O of the two-dimensional XY orthogonal coordinate system is incorporated into a distorted circular image memory as pixel array data. The thus incorporated distorted circular image S is an image obtained by photography by use of a fisheye lens and also an image to be converted. A planar regular image memory for storing the planar regular image T obtained by conversion is also provided.

Next, a setting is performed, such as, which part of the distorted circular image S is to be put at the center, in which orientation and to what extent the size the image is to be cut out. As described above, this setting is performed by setting the following three parameters. First, in a three-dimensional XYZ orthogonal coordinate system including the above two-dimensional XY orthogonal coordinate system, a visual line vector n starting from the origin O to face any given direction is set as a parameter indicating a cut-out position of a planar regular image. This visual line vector n is geometrically a vector which is regulated by an azimuthal angle $\alpha$ and a zenithal angle $\beta$. However, in practice, as described above, the vector can be defined by designating a cut-out center point P (x0, y0). Next, a predetermined planar inclination angle $\phi$ is set as a parameter indicating the cut-out orientation of the planar regular image, and a predetermined magnification m is set as a parameter indicating the cut-out size of the planar regular image.

When the above-described settings are made, the preparation for conversion has been completed. Thereafter, an operation device (which may be constituted with hardware using an LSI and others or may be constituted by installing dedicated software for a general computer) having functions to gain access to the above-described individual memories is used to perform each of the following processings.

First, a corresponding coordinate calculating step is performed in which coordinates (x, y) which correspond to coordinates (u, v) of one target pixel, with respect to a planar regular image (an image made up of an aggregate of many pixels arranged at a position indicated by coordinates (u, v) on the two-dimensional UV orthogonal coordinate system) to be stored inside a planar regular image memory, are calculated. However, in reality, in place of calculating the corresponding coordinates (x, y) which correspond to coordinates (u, v) on the two-dimensional UV orthogonal coordinate system, calculation is made for the corresponding coordinates (x, y) which correspond to the coordinates (u, v) on the two-dimensional UV curved coordinate system. More specifically, as described in the model of FIG. 19, first, a point G which is away from an origin O only by "a product m·R of the magnification m and the radius R" on the visual line vector n is given as an origin, and a two-dimensional UV orthogonal coordinate system arranged on a plane passing through the point G and orthogonal to the visual line vector n to have an orientation according to a planar inclination angle $\phi$ is defined. Next, the two-dimensional UV orthogonal coordinate system is curved along the side face of "a virtual cylindrical column in which the point G gives one point on the side face to have a central axis parallel to the V axis of the two-dimensional UV orthogonal coordinate system and also passing through the origin O of the three-dimensional XYZ orthogonal coordinate system," thereby defining the two-dimensional UV curved coordinate system. Predetermined correspondence relationship equations showing a correspondence relationship between coordinates (u, v) on the two-dimensional UV curved coordinate system and coordinates (x, y) on the two-dimensional XY orthogonal coordinate system are used to calculate the corresponding coordinates (x, y) which correspond to any given coordinates (u, v).

Then, a pixel value of a pixel arranged in the vicinity of the thus calculated corresponding coordinates (x, y) is read out from the distorted circular image memory, and a pixel value of the target pixel is determined on the basis of the read-out pixel value. Further, a target pixel inside the planar regular image memory for storing a planar regular image is subjected to processing for writing the thus determined pixel value. Therefore, pixel values of all pixels necessary for constituting the planar regular image may be written into the planar regular image memory.

As described above, the two-dimensional UV orthogonal coordinate system and the two-dimensional UV curved coordinate system are common in that they are both two-dimensional coordinate systems having the U axis and the V axis. Accordingly, a planar regular image T defined on the two-dimensional UV orthogonal coordinate system and a curved regular image C defined on the two-dimensional UV curved coordinate system are common in that they are constituted with an aggregate of many pixels arranged at a position indicated by coordinate value (u, v). Therefore, on the basis of pixel array data stored inside the planar regular image memory, an image is displayed on a plane, thereby obtaining the planar regular image T. However, when an image is displayed on the side face of a cylindrical column, the curved regular image C is to be obtained. In this case, for the sake of convenience in explanation, the memory for storing the pixel array data after conversion is referred to as "a planar regular image memory." The pixel array data to be stored into the memory itself may be referred to as data for the planar regular image T or also referred to as data for the curved regular image C.

A difference of characteristics between a conventional conversion method shown in the model of FIG. 9 and the conversion method of the present invention shown in the model of FIG. 19 will be described clearly as follows. First, in the former, "a pixel value of a target pixel positioned at coordinates (u, v) in the pixel array data after conversion" is determined on the basis of "a pixel value of a pixel positioned in the vicinity of corresponding coordinates (x, y) determined by using correspondence relationship equations showing a correspondence relationship between coordinates (u, v) on the two-dimensional UV "orthogonal" coordinate system and coordinates (x, y) on the two-dimensional XY orthogonal coordinate system" and an image is displayed on a monitor screen on a plane on the basis of the pixel array data after conversion, thereby obtaining the planar regular image T. On the other hand, in the latter, "a pixel value of a target pixel positioned at coordinates (u, v) in the pixel array data after conversion" is determined on the basis of "a pixel value of a pixel positioned in the vicinity of coordinates (x, y) determined by using correspondence relationship equations showing a correspondence relationship between coordinates (u, v) on the two-dimensional UV "curved" coordinate system and coordinates (x, y) on the two-dimensional XY orthogonal coordinate system)," and an image is displayed on a monitor screen on a plane on the basis of the pixel array data after conversion, thereby obtaining the planar regular image T.

As described above, a difference between these is only in that the correspondence relationship equations to be used are different. This difference will greatly improve a distortion on the planar regular image T. In particular, the vicinity of the right contour and the vicinity of the left contour on an image in the example shown in FIG. 14 are greatly improved in the distortion. Thus, even where horizontal panning is performed, it is possible to obtain a smooth panning image. As a matter of course, when the invention is used in a monitoring camera system which uses a fisheye lens, the visibility of recognizing detailed features of a person positioned on the right side or the left side of an image is greatly improved. This is because, in the two-dimensional UV curved coordinate system, the U axis is not a straight line axis but a circular-arc axis.

The two-dimensional UV curved coordinate system is a coordinate system on the side face of a cylindrical column. Thus, even when the U axis is a circular-arc axis, the V axis is a straight line axis. For this reason, the vicinity of the upper contour and the vicinity of the lower contour on an image in the example shown in FIG. 14 are not effectively corrected for the distortion. However, where horizontal panning is performed, a motion picture-constituting frame is to deviate in a transverse direction. Thus, distortions in the vicinities of right and left contours could be lessened to obtain a sufficiently smooth panning image. Further, in applications of a monitoring camera, the visibility is usually more important in the vicinities of right and left contours than in the vicinities of upper and lower contours. The circular-arc shaped U axis is set so as to give a horizontal axis, thereby providing a sufficient distortion-correcting effect in practical use.

In the basic embodiment described here, "a virtual cylindrical column in which a point G gives one point on the side face thereof to have a central axis parallel to the V axis of the two-dimensional UV orthogonal coordinate system and passing through the origin O of the three-dimensional XYZ orthogonal coordinate system" is used to define the two-dimensional UV curved coordinate system. Therefore, as shown by the single dotted and dashed line in FIG. 19, the virtual cylindrical column is to be a cylindrical column having a radius mR, with a straight line V' passing through the origin O given as the central axis. However, the virtual cylindrical column used in carrying out the present invention is not necessarily limited to a cylindrical column having a radius mR. Any cylindrical column is acceptable as long as it is "a cylindrical column in which the point G gives one point on the side face to have a central axis parallel to the V axis of the two-dimensional UV orthogonal coordinate system."

However, in practical use, as described in the basic embodiment, it is preferable that "a cylindrical column having a radius mR, with a straight line V' passing through the origin O given as a central axis" is used as the virtual cylindrical column. This is because a curvature radius of the virtual cylindrical column is made equal to the mR, thereby, at least at a part along the circular-arc U axis, a distance from the origin O is a constant value, mR, and an optimal distortion correction effect may be obtained. In reality, experiments conducted by the present inventor have provided an ideal planar regular image which is least distorted, where "a cylindrical column having a radius mR, with a straight line V' passing through the origin O given as a central axis" is used as the virtual cylindrical column.

Further, since a display screen of a monitoring device for general use is rectangular in contour, it is preferable to obtain a planar regular image having a rectangular contour for adapting to the display screen concerned in view of carrying out the present invention. As described above, where the planar regular image stored inside a planar regular image memory is rectangular in contour, it is preferable that a two-dimensional UV orthogonal coordinate system having the U axis in a direction parallel to the longer side of the rectangle and the V axis in a direction parallel to the shorter side is curved along the side face of the virtual cylindrical column having a central axis parallel to the V axis, thereby defining the two-dimensional UV curved coordinate system.

This is because, in the present invention, a coordinate axis which is curved in a circular-arc shape is referred to as the U axis, while a coordinate axis which is formed in a straight line is referred to as the V axis, and when the U axis is given in a direction parallel to the longer side, a greater effect is obtained in curving the ends. An extent that both right and left ends come out from a plane in a case where a cylindrical column is arranged on a planar regular image T having a rectangular contour as shown in FIG. 14 so that the central axis faces a vertical direction and the planar regular image T is rolled around the side face of the cylindrical column is compared with an extent that both upper and lower ends come out from the plane in a case where a cylindrical column is arranged so that the central axis faces a transverse direction and the planar regular image T is rolled around the side face of the cylindrical column. Here, the former case comes out greater than the latter case. This indicates that a distortion-correcting effect in the vicinities of right and left both ends in the former case is more apparent than a distortion-correcting effect in the vicinities of both upper and lower ends in the latter case. For this reason, in general, it is preferable to give the U axis in a direction parallel to the longer side.

<<<Section 5. Correspondence Relationship Equations Used in the Present Invention>>>

As described above, a substantial difference between a conventional conversion method shown by the model of FIG. 9 and the conversion method of the present invention shown by the model of FIG. 19 is only in that correspondence relationship equations are different which are used in determining corresponding coordinates (x, y) to any given coordinates (u, v). More specifically, the former uses "correspondence relationship equations" which shows a correspondence relationship between coordinates (u, v) on the two-dimensional UV "orthogonal" coordinate system and coordinates (x, y) on the two-dimensional XY orthogonal coordinate system. On the other hand, the latter uses "correspondence relationship equations" which shows a correspondence relationship between coordinates (u, v) on the two-dimensional UV "curved" coordinate system and coordinates (x, y) on the two-dimensional XY orthogonal coordinate system. Then, as described in Section 3, the former correspondence relationship equations will be the equations (1) to (9) in FIG. 17. These equations are adjusted to some extent, by which the latter correspondence relationship equations can be obtained, which will be described below.

As described above in Section 3, the equations (1) to (9) in FIG. 17 are obtained by correcting the equations (10), (11) which show a relationship between coordinates (u, v) and coordinates (x, y) in a model satisfying special conditions shown in FIG. 18 by rotation factors regulated by an azimuthal angle α, a zenithal angle β, and a planar inclination angle φ. Therefore, consideration is first given to a model which satisfies special conditions shown in FIG. 18, that is, a model in which β is set to be equal to 0 degrees, an origin G is positioned at coordinates (0, 0, mR) on the three-dimensional XYZ orthogonal coordinate system, and the two-dimensional UV orthogonal coordinate system is defined on a plane parallel to an XY plane with regard to a difference between the two-dimensional UV orthogonal coordinate system and the two-dimensional UV curved coordinate system.

Figure 20:
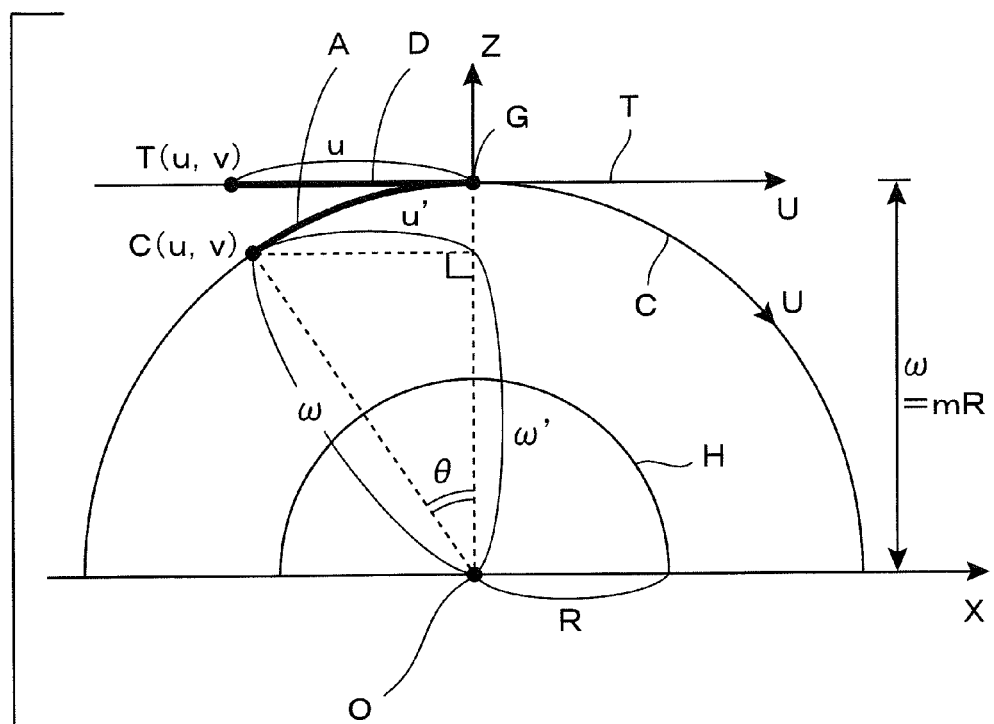
FIG. 20 is a perspective view showing a correspondence relationship between a point T (u, v) on the two-dimensional UV orthogonal coordinate system and a point C (u, v) on the two-dimensional UV curved coordinate system.

FIG. 20 is a side elevational view showing a positional relationship between the two-dimensional UV orthogonal coordinate system (the coordinate plane is given as T in the figure) and the two-dimensional UV curved coordinate system obtained by curving the former (the coordinate plane is given as C in the figure). The UV plane, which is a coordinate plane of the two-dimensional UV orthogonal coordinate system, is a plane parallel to the XY plane on the XYZ three-dimensional orthogonal coordinate system, with an interval between these set to be w=mR. As shown in the figure, the U axis is defined in a horizontal direction along the UV plane, and the V axis is defined at a point G in a perpendicular direction with respect to the drawing sheet. Next, a planar regular image T is to be defined on the UV plane.

On the other hand, a UV curved face, which is a coordinate plane of the two-dimensional UV curved coordinate system, is a face obtained by curving the UV plane along the side face of the virtual cylindrical column. In this case, the virtual cylindrical column is a cylindrical column in which the Y axis (an axis passing the origin O in a perpendicular direction with respect to the drawing sheet) is given as a central axis to have a radius w=mR and in contact with the UV plane at a position of the V axis. The UV curved face is in alignment with the side face of the virtual cylindrical column, the U axis is defined in a direction along a circular arc of a circle having a radius w=mR, and the V axis is defined at the point G in a perpendicular direction with respect to the drawing sheet. Next, the curved regular image C is defined on the UV curved face.

As described above, the two-dimensional UV orthogonal coordinate system and the two-dimensional UV curved coordinate system are common in that they both have the V axis which is a first coordinate axis but different in that spatial position of the U axis which is a second coordinate axis. However, their coordinate graduations are all engraved in the same width. They are also common in that the position of any given one point on the coordinate plane is indicated by coordinates (u, v). Then, consideration will be given to a relationship of two-points on each coordinate plane indicated by the same coordinates (u, v).

First, as shown at the above left in the figure, attention is paid to a point T (u, v) on the two-dimensional UV orthogonal coordinate system. This point T (u, v) is a point on the planar regular image T, spaced away from the origin G by a coordinate value u along the U axis (the point is plotted at a position spaced away by the length of a segment D depicted by the heavy line in the figure), and a point spaced away from the origin G in the V axis direction by a coordinate value v (a distance in the V axis direction is a distance in a perpendicular direction with respect to the drawing sheet, and therefore not shown in the figure).

Next, attention is paid to a point C (u, v) on the two-dimensional UV curved coordinate system. This point C (u, v) is a point on the curved regular image C, spaced away from the origin G along a circular arc A by a coordinate value u, and a point spaced away from the origin G in the V axis direction by a coordinate value v (a distance in the V axis direction is a distance in a perpendicular direction with respect to the drawing sheet, and therefore not shown in the figure). Here, the length of the circular arc A depicted by the heavy line is equal to the length of the segment D depicted by the heavy line.

As described above, the point T (u, v) and the point C (u, v) are both points expressed by coordinates (u, v). However, since these are points defined by different coordinate systems, these are different in spatial position indicated by an XYZ three-dimensional orthogonal coordinate system. More specifically, in view of a coordinate value of the XYZ three-dimensional orthogonal coordinate system, coordinates of the point T (u, v) are given as T (u, v, w), while coordinates of the point C (u, v) are given as C (u', v, w'). Here, as shown in the figure, the following equations are obtained.

$$u' = w \cdot \sin\theta \qquad \text{Equation (12)}$$

$$w' = w \cdot \cos\theta \qquad \text{Equation (13)}$$

Further, since the length of the circular arc A is equal to an absolute value of the coordinate value u and the radius of the circular arc A is w, the angle θ shown in FIG. 20 is θ=u/w radian. Therefore, as shown in the figure, the following equations are obtained.

$$u' = w \cdot \sin(u/w) \qquad \text{Equation (14)}$$

$$w' = w \cdot \cos(u/w) \qquad \text{Equation (15)}$$

It is noted that both of these UV coordinate systems are common in that the V axis is a coordinate axis and therefore, Y coordinate values both at the points T and C have the same coordinate value v.

Accordingly, in place of a variable u in the equations (1), (2) shown in FIG. 17, a variable u' shown in equation (14) is used, and in place of a variable w, a variable w' shown in the equation (15) is used. Thereby, as shown in the upper part in FIG. 21, the following equations are obtained.

$$x = R(u'A + vB + w'C)/\sqrt{(u'^2 + v^2 + w'^2)} \quad \text{Equation (1')}$$

$$y = R(u'D + vE + w'F)/\sqrt{(u'^2 + v^2 + w'^2)} \quad \text{Equation (2')}$$

In this case, there is no change in correction of rotation factors based on Euler angle α, β, φ. Thus, rotational coefficients A to F can be calculated by using the equations (3) to (8) shown in FIG. 17 as they are.

Thus, correspondence relationship equations used in the present invention, that is, correspondence relationship equations which show a correspondence relationship between coordinates (u, v) on the two-dimensional UV curved coordinate system and coordinates (x, y) on the two-dimensional XY orthogonal coordinate system will be given as the equations (1'), (2') shown above in FIG. 21 and the equation (3) to (9) shown in FIG. 17.

With convenience of actual operation taken into account, a common coefficient G is defined as $$G = R/\sqrt{(u'^2 + v^2 + w'^2)},$$

and the equations (14), (15) are substituted for u' and w' in the above equation to obtain the following as shown in the middle of FIG. 21, $$G = R/\sqrt{(w^2 + v^2)}.$$

In conclusion, the correspondence relationship equations used in the present invention will be defined by the following equation as shown below in FIG. 21:

$$x = G(u'A + vB + w'C) \quad \text{Equation (16)}$$

$$y = G(u'D + vE + w'F) \quad \text{Equation (17)}$$

$$G = R/\sqrt{(w^2 + v^2)} \quad \text{Equation (18)}$$

and the equations (3) to (9) in FIG. 17.

Figure 22:
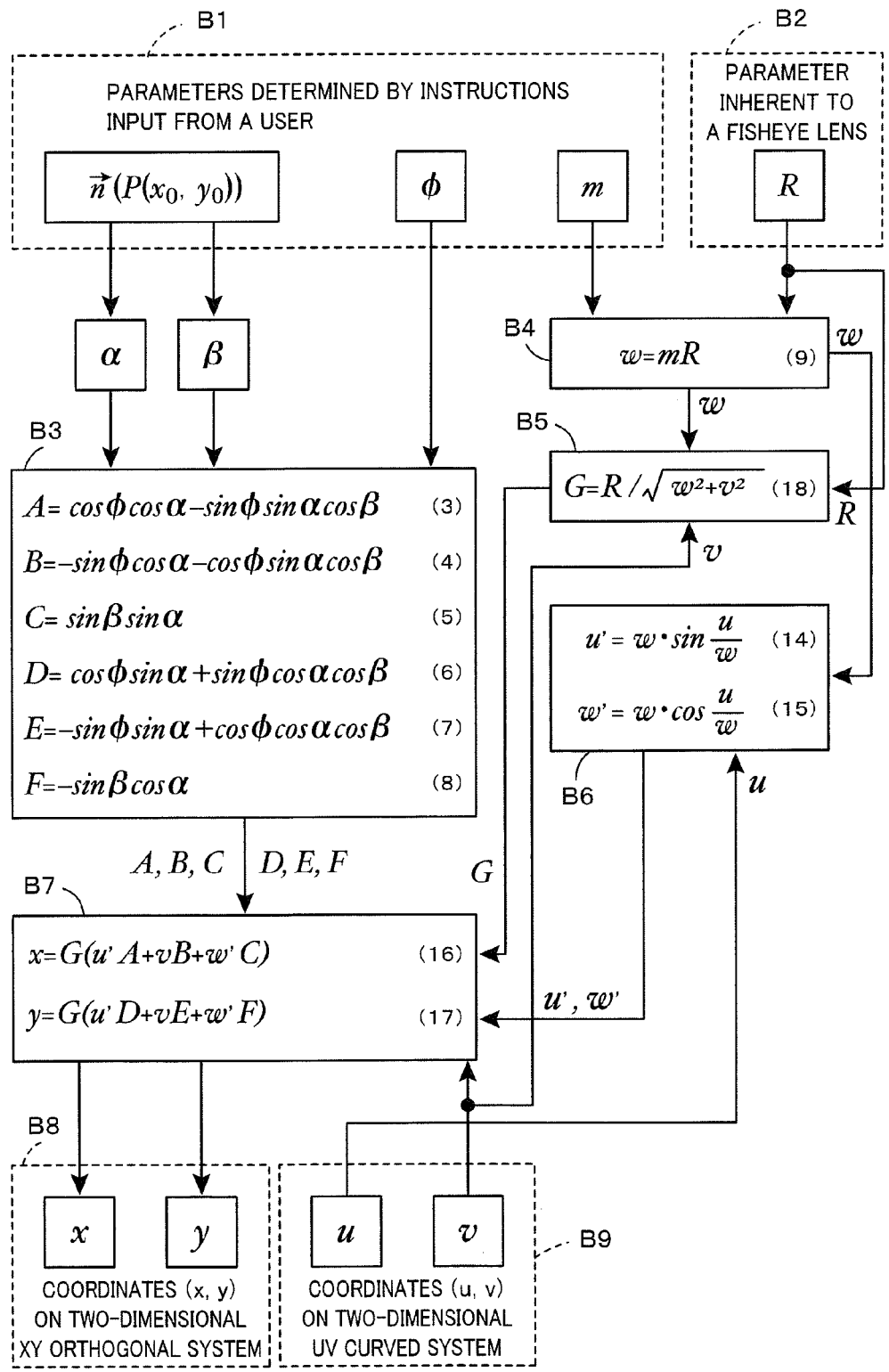
FIG. 22 is a block diagram showing processes of calculating corresponding coordinates (x, y) on the two-dimensional XY orthogonal coordinate system which correspond to any given coordinates (u, v) on the two-dimensional UV curved coordinate system by using the correspondence relationship equations for orthogonally projected images shown in FIG. 21.

FIG. 22 is a block diagram showing processes in which the above correspondence relationship equations are used to calculate corresponding coordinates (x, y) on the two-dimensional XY orthogonal coordinate system which correspond to any given coordinates (u, v) on the two-dimensional UV curved coordinate system. Hereinafter, a description will be given for a calculating operation process of the corresponding coordinates (x, y) with reference to blocks B1 to B9 in the block diagram.

First, the block B1 indicated by the broken line above in the figure includes parameters determined by instructions input from a user. More specifically, as a parameter indicating a cut-out position of a planar regular image, a visual line vector n is given, as a parameter indicating a cut-out orientation, a planar inclination angle φ is given, and as a parameter indicating a cut-out dimension, a magnification m is given. In this case, the visual line vector n is actually given as a position of a cut-out center point P (x0, y0) on a distorted circular image S and an azimuthal angle α and a zenithal angle β can be determined on the basis of the information thereof.

Further, the block B2 indicated by the broken line in the above right in the figure includes a radius R of the distorted circular image S. The radius R is a parameter inherent to a fisheye lens to be used. Where the present invention is applied to a fisheye lens monitoring system and others, a fisheye lens usually mounted on a monitoring camera is a commercially available one. Therefore, a value of the radius R inherent to the fisheye lens concerned may be set in advance. As a matter of course, in a system in which a fisheye lens can be selected from various types thereof and used, it is necessary to set a radius R inherent to the selected fisheye lens.

The block B9 shown by the broken line below in the figure includes coordinates (u, v) on the two-dimensional UV curved coordinate system, and the block B8 shown by the broken line left below in the figure includes coordinates (x, y) on the two-dimensional XY orthogonal coordinate system. In conclusion, the process shown in FIG. 22 is to show an operation process for determining two variables x, y inside the block B8 on the basis of two variable u, v inside the block B9. The block B9 corresponds to an inlet of the operation process, while the block B8 corresponds to an outlet of the operation process.

The block B3 includes the equations (3) to (8) in FIG. 17. These equations are operational equations for determining six types of rotational coefficients A to F on the basis of Euler angles α, β and φ given from the block B1. The Euler angles α, β and φ are parameters which will change depending on instructions input from a user. Therefore, an operation inside the block B3 will be executed every time new instructions are input from a user.

The block B4 includes the equation (9) in FIG. 17. In this case, a magnification m given from the block B1 is multiplied with a radius R given from the block B2 to obtain a product w. The block B5 therebelow includes the equation (18) shown in FIG. 21. In this case, a common coefficient G is determined on the basis of a radius R given from the block B2, a product w given from the block B4 and a coordinate value v given from the block B9. The block B6 further therebelow includes the equations (14), (15) shown in FIG. 20. In this case, on the basis of the product w given from the block B4 and a coordinate value u given from the block B9, values u' and w' are determined.

Then, the block B7 includes the equations (16), (17) shown in FIG. 21. In this case, values x, y are determined on the basis of six rotational coefficients A to F given from the block B3, a common coefficient G given from the block B5, values u' and w' given from the block B6 and a coordinate value v given from the block B9. The thus determined values x, y are given to the block B8.

As described above, on the basis of any given coordinates (u, v) on the two-dimensional UV curved coordinate system, calculation is to be made for corresponding coordinates (x, y) on the two-dimensional XY orthogonal coordinate system corresponding thereto.

<<<Section 6. Constitution of the Image Converter of the Present Invention>>>

Herein, a description will be given for an image converter of one embodiment of the present invention with reference to the block diagram in FIG. 23. This description is based on an example which utilizes a fisheye lens monitoring system. As shown in the figure, this fisheye lens monitoring system is constituted with a parameter input unit 100, a corresponding coordinate calculating unit 200, a planar regular image forming unit 300, a fisheye lens-mounted digital camera 410, a planar regular image memory 420, a monitoring device 430 and a distorted circular image memory 440.

Of these individual constituents, a part constituted with the parameter input unit 100, the corresponding coordinate calculating unit 200, the planar regular image forming unit 300, the planar regular image memory 420 and the distorted circular image memory 440 is the image converter of the present invention, having a function of cutting out a part of a distorted circular image photographed by use of a fisheye lens to convert it into a planar regular image. A fisheye lens monitoring system is constituted by adding, to the image converter, the fisheye lens-mounted digital camera 410 for photographing a distorted circular image S and the monitoring device 430 for displaying a planar regular image after conversion.

The fisheye lens mounted digital camera 410 is a digital video camera generally used in a monitoring camera and others, having a function of photographing a subject in the vicinity at a 180-degree field angle and generating the distorted circular image S with a radius R as digital data. The distorted circular image S generated as the digital data is stored into the distorted circular image memory 440. The image converter converts it into a planar regular image T and stores the image into the planar regular image memory 420. Therefore, the planar regular image T obtained at the planar regular image memory is displayed on a screen by the monitoring device 430.

The distorted circular image memory 440 is constituted with an image data storing buffer memory for general use, thereby storing the distorted circular image S as pixel array data constituted with an aggregate of many pixels arranged at a position indicated by coordinates (x, y) on the two-dimensional XY orthogonal coordinate system. This distorted circular image S is, as described already, generated as an image having a radius R, with an origin O of the two-dimensional XY orthogonal coordinate system given at the center.

On the other hand, the planar regular image memory 420 is also constituted with an image data storing buffer memory for general use, thereby storing the planar regular image T as pixel array data constituted with an aggregate of many pixels arranged at a position indicated by coordinates (u, v) on the two-dimensional UV orthogonal coordinate system. In most cases, the planar regular image T is generated as a rectangular image appropriate for displaying on a display screen of the monitoring device 430. As a matter of course, the planar regular image T may be generated in any contour shape.

In this case, for the sake of conveniences in explanation, a memory for storing the pixel array data after conversion is referred to as "the planar regular image memory 420." However, as described in Section 4, the pixel array data stored inside the memory 420 itself may be also referred to as data of planar regular image T or may be referred to as data of curved regular image C. In reality, where the distorted circular image S stored inside the distorted circular image memory 440 is converted into a regular image on the UV coordinate system, as described by using the model of FIG. 19, the two-dimensional UV curved coordinate system is used in place of the two-dimensional UV orthogonal coordinate system. Therefore, the pixel array data written into the memory 420 is to be data of the curved regular image C. However, eventually, the pixel array data inside the memory 420 is read out at the monitoring device 430 and displayed as the planar regular image T on a monitor screen on a plane. Thus, in this case, the memory 420 is referred to as "a planar regular image memory" and image data after conversion to be stored thereinside is referred to as the planar regular image T.

The distorted circular image S stored inside the distorted circular image memory 440 is converted into the planar regular image T and written directly into the planar regular image memory 420. This direct processing is executed by the planar regular image forming unit 300. However, in carrying out this processing, it is necessary to obtain corresponding coordinates (x, y) on the XY coordinate system which corresponds to coordinates (u, v) on the UV coordinate system. The corresponding coordinate calculating unit 200 is to deal with the processing of calculating the corresponding coordinates (x, y). More specifically, the corresponding coordinate calculating unit 200 has a function of carrying out the operation using correspondence relationship equations described in Section 5 where any given coordinates (u, v) are given from the planar regular image forming unit 300, thereby calculating the corresponding coordinates (x, y) and returning these to the planar regular image forming unit 300.

In order to execute the operation using the correspondence relationship equations described in Section 5, there are needed three parameters, that is, a visual line vector n, a planar inclination angle $\phi$ and a magnification m. The parameter input unit 100 is a constituent which inputs these three parameters on the basis of instructions input from a user. More specifically, the parameter input unit 100 has functions of inputting the visual line vector n facing any given direction starting from an origin O in the three-dimensional XYZ orthogonal coordinate system as a parameter indicating a cut-out position of a planar regular image, inputting the predetermined planar inclination angle $\phi$ as a parameter indicating a cut-out orientation of the planar regular image and also inputting the predetermined magnification m as a parameter indicating a cut-out dimension of the planar regular image.

It is noted that in the present embodiment, the monitoring device 430 is designed to display the distorted circular image S stored inside the distorted circular image memory 440, when necessary. Then, the parameter input unit 100 has a function of receiving instructions input from a user who designates one point on the distorted circular image S displayed on the monitoring device 430, thereby recognizing a position of the one point concerned as a cut-out center point P(x0, y0) and taking it as a parameter indicating the visual line vector n.

For example, in a state that the distorted circular image S shown in FIG. 2 is displayed on a screen of the monitoring device 430, a user designates one point on the image (for example, a position of the nose of a woman), by which the point concerned is recognized as a cut-out center point P (x0, y0) and taken as a parameter indicating the visual line vector n. In addition, the user inputs instructions to designate the magnification m and the planar inclination angle $\phi$. As a matter of course, various types of man-machine interfaces can be incorporated into the parameter input unit 100, and the magnification m and the planar inclination angle $\phi$ may be designated by any input method.

The corresponding coordinate calculating unit 200 uses the thus set individual parameters and the previously set radius R to perform the operation of calculating corresponding coordinates (x, y) which correspond to any given coordinates (u, v) given from the planar regular image forming unit 300. Correspondence relationship equations used in the operation are, as shown in Section 5. The gist thereof will be given as follows.

More specifically, as shown in the model of FIG. 19, first, defined is a two-dimensional UV orthogonal coordinate system in which a point G spaced away from an origin O on the visual line vector n by "a product m·R of the magnification m and the radius R" is given as an origin to be arranged in an orientation according to the planar inclination angle $\phi$ on a plane passing through the point G and orthogonal to the visual line vector n. More specifically, for example, as shown in FIG. 19, the two-dimensional UV orthogonal coordinate system may be arranged in an orientation at which an angle formed between a rotational reference axis J and the U axis is equal to the planar inclination angle $\phi$, wherein the rotational reference axis J is an axis passing through the origin G, parallel to an XY plane and orthogonal to the visual line vector n.

Next, a definition will be made for "a virtual cylindrical column in which the point G gives one point on the side face to have a central axis parallel to the V axis of the two-dimensional UV orthogonal coordinate system." As described above, in practical use, it is preferable that the radius of the virtual cylindrical column is set to be mR and the central axis gives a straight line V' passing through the origin O and parallel to the V axis. Then, the two-dimensional UV orthogonal coordinate system is curved along the side face of the virtual cylindrical column, thereby defining the two-dimensional UV curved coordinate system.

Correspondence relationship equations used in an operation by the corresponding coordinate calculating unit 200 may be any equation which shows a correspondence relationship between coordinates (u, v) on the thus defined two-dimensional UV curved coordinate system and coordinates (x, y) on the two-dimensional XY orthogonal coordinate system. More specifically, such a correspondence relationship equation may be geometrically determined by which, when on a virtual sphere having a radius R at the center of an origin O, a corresponding point Qi on the sphere corresponding to a point Si indicated by coordinates (xi, yi) on the two-dimensional XY orthogonal coordinate system is taken depending on a projection method of the fisheye lens used and given as (ui, vi) are coordinates on the two-dimensional UV curved coordinate system of an intersecting point Ci between a straight line connecting the origin O with the corresponding point Qi on the sphere and a cylindrical column side-face coordinate plane of the two-dimensional UV curved coordinate system, the coordinates (xi, yi) are determined as corresponding coordinates which correspond to the coordinates (ui, vi).

In particular, as in the examples described above, where the distorted circular image S stored in the distorted circular image memory 440 is an orthogonally projected image photographed by a fisheye lens based on an orthogonal projection method, as shown in FIG. 19, the corresponding point Qi on the sphere gives a point immediately above the point Si. In other words, with respect to the point Si indicated by coordinates (xi, yi), a point indicated by coordinates (xi, yi, zi) given as an intersecting point between a straight line passing through the point Si and parallel to the Z axis and the virtual sphere H gives the corresponding point Qi on the sphere.

Then, in the orthogonal projection method, as shown in FIG. 19, specific correspondence relationship equations for an orthogonally projected image on definition of individual coordinate systems and angles are, as described in Section 5, the following equations:

$$x = G(u'A + vB + w'C) \quad \text{Equation (16)}$$

$$y = G(u'D + vE + w'F) \quad \text{Equation (17)}$$

$$G = R/\sqrt{(w^2 + v^2)} \quad \text{Equation (18).}$$

In the above equations, rotational coefficients A to E will be given as follows:

$$A = \cos\phi \cos\alpha - \sin\phi \sin\alpha \cos\beta \quad \text{Equation (3)}$$

$$B = -\sin\phi \cos\alpha - \cos\phi \sin\alpha \cos\beta \quad \text{Equation (4)}$$

$$C = \sin\beta \sin\alpha \quad \text{Equation (5)}$$

$$D = \cos\phi \sin\alpha + \sin\phi \cos\alpha \cos\beta \quad \text{Equation (6)}$$

$$E = -\sin\phi \sin\alpha + \cos\phi \cos\alpha \cos\beta \quad \text{Equation (7)}$$

$$F = -\sin\beta \cos\alpha \quad \text{Equation (8).}$$

In this case, the azimuthal angle $\alpha$ is an angle formed between an orthogonal projection on an XY plane of the visual line vector n and the Y axis, the zenithal angle $\beta$ is an angle formed by the visual line vector n and a positive direction of the Z axis, and the planar inclination angle $\phi$ is an angle set as a parameter.

Figure 23:
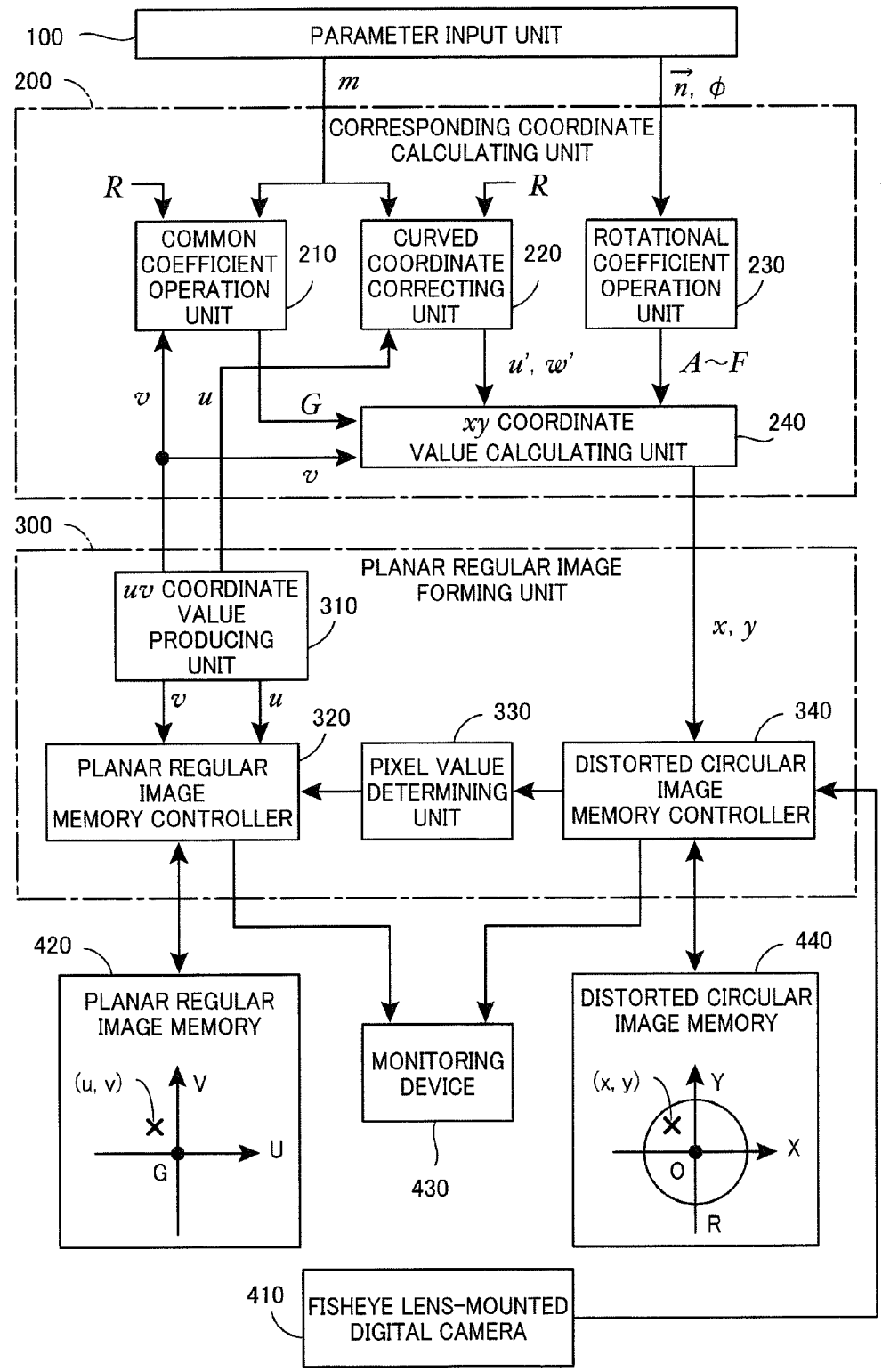
FIG. 23 is a block diagram showing a basic constitution of the image converter according to one embodiment of the present invention.

The corresponding coordinate calculating unit 200 shown in FIG. 23 has a function of calculating corresponding coordinates (x, y) which correspond to coordinates (u, v) by an operation based on the above-described correspondence relationship equations for an orthogonally projected image. As shown in the figure, it is provided with a common coefficient operation unit 210, a curved coordinate correcting unit 220, a rotational coefficient operation unit 230, and an xy coordinate value calculating unit 240.

The common coefficient operation unit 210 performs such processing that when a magnification m is given from the parameter input unit 100 and a coordinate v is given from the planar regular image forming unit 300, a previously set radius R of a distorted circular image is used to calculate a common coefficient G on the basis of the following operational equations:

$$w = mR \quad \text{Equation (9)}$$

$$G = R/\sqrt{(w^2 + v^2)} \quad \text{Equation (18).}$$

On the other hand, the curved coordinate correcting unit 220 has a function of performing an operation necessary for correcting coordinates (u, v) on the two-dimensional UV orthogonal coordinate system defined on a plane to give coordinates (u, v) on the two-dimensional UV curved coordinate system defined on the side face of a cylindrical column. Thus, the curved coordinate correcting unit 220 performs such processing that when a magnification m is given from the parameter input unit 100 and a coordinate u is given from the planar regular image forming unit 300, a previously set radius R of a distorted circular image is used to calculate u' and w' on the basis of the following operational equations:

$$w = mR \quad \text{Equation (9)}$$

$$u' = w' \sin(u/w) \quad \text{Equation (14)}$$

$$w = w' \cos(u/w) \quad \text{Equation (15).}$$

If sin (u/w) of the equation (14) is rewritten to be cos (u/w+π/2), it is possible to calculate both the equation (14) and the equation (15) by an operation unit of cos function. Therefore, it is possible to reduce hardware to be mounted. (As a matter of course, similar results may be obtained by rewriting the equation (15) into an operational equation of sin function and both the equations can be calculated by an operation unit of sin function.)

Further, the rotational coefficient operation unit 230 performs such processing that when a visual line vector n and a planar inclination angle $\phi$ are given from the parameter input unit 100, the azimuthal angle $\alpha$ and the zenithal angle $\beta$ are determined on the basis of the visual line vector n to calculate rotational coefficients A, B, C, D, E, and F on the basis of the following operational equations:

$$A = \cos\phi \cos\alpha - \sin\phi \sin\alpha \cos\beta \quad \text{Equation (3)}$$

$$B = -\sin\phi \cos\alpha - \cos\phi \sin\alpha \cos\beta \quad \text{Equation (4)}$$

$$C = \sin\beta \sin\alpha \quad \text{Equation (5)}$$

$$D = \cos\phi \sin\alpha + \sin\phi \cos\alpha \cos\beta \quad \text{Equation (6)}$$

$$E = -\sin\phi \sin\alpha + \cos\phi \cos\alpha \cos\beta \quad \text{Equation (7)}$$

$$F = -\sin\beta \cos\alpha \quad \text{Equation (8).}$$

Then, the xy coordinate value calculating unit 240 performs such processing that a coordinate v given from the planar regular image forming unit 300, rotational coefficients A, B, C, D, E, F calculated by the rotational coefficient operation unit 230, a common coefficient G calculated by the common coefficient operation unit 210, u' and w' calculated by the curved coordinate correcting unit 220 and a previously set radius R of a distorted circular image are used to calculate x and y on the basis of the following operational equations:

$$x=G(u'A+vB+w'C) \quad \text{Equation (16)}$$

$$y=G(u'D+vE+w'F) \quad \text{Equation (17)}$$

thereby giving the result to the planar regular image forming unit 300. It is noted that since the operation of the above equation (16) is different from that of the equation (17) only in a combination of rotational coefficients to be used, the same operational circuit is in practice used to calculate the equation (16) and the equation (17) by time division, thus making it possible to reduce hardware to be mounted.

Further, in FIG. 23, a description is given for a case where a fisheye lens mounted on the digital camera 410 is fixed and, therefore, a value of the radius R inherent to the lens (the radius R of a distorted circular image) is previously determined. In a system in which a fisheye lens and a digital camera are selected from various types thereof and used, the radius R may be given as a variable parameter. In this case, the parameter input unit 100 may input the radius R as a variable parameter on the basis of instructions from a user or a distorted circular image S stored in the distorted circular image memory 440 (by analyzing image data constituting the distorted circular image S to automatically recognize the radius R of the image). The common coefficient operation unit 210 and the curved coordinate correcting unit 220 are to perform an operation which uses a radius R input by the parameter input unit 100.

A specific description has been so far given for operation processing performed by the corresponding coordinate calculating unit 200 shown in FIG. 23. In conclusion, the corresponding coordinate calculating unit 200 has a function of returning corresponding coordinates (x, y) thereto when any given coordinates (u, v) are provided. The planar regular image forming unit 300 performs processing to form a planar regular image inside the planar regular image memory 420 with the help of the corresponding coordinate calculating unit 200.

More specifically the planar regular image forming unit 300 first gives coordinates (u, v) of one target pixel constituting a planar regular image to the corresponding coordinate calculating unit 200 so that the corresponding coordinates (x, y) can be calculated. Next, it reads out a pixel value of a pixel arranged in the vicinity of the corresponding coordinates (x, y) inside the distorted circular image memory 440, performing processing for determining a pixel value of a target pixel on the basis of the thus read pixel value with regard to individual pixels constituting the planar regular image, and writing pixel values of the individual pixels into the planar regular image memory 420, thereby forming the planar regular image.

In the example shown in FIG. 23, the planar regular image forming unit 300 is constituted with a uv coordinates value producing unit 310, a planar regular image memory controller 320, a pixel value determining unit 330 and a distorted circular image memory controller 340.

In this case, the planar regular image memory controller 320 is a control device for writing data into and reading it from the planar regular image memory 420. When a pixel value of a specific pixel is determined by the pixel value determining unit 330, the planar regular image memory controller 320 writes the determined pixel value into the specific pixel concerned inside the planar regular image memory 420. Thereby, upon completion of processing for writing the pixel values for all pixels, a planar regular image T is to be formed inside the planar regular image memory 420. Therefore, this time, the planar regular image memory controller 320 reads out data of the planar regular image T, outputs it on the monitoring device 430, thereby performing processing for displaying the planar regular image T on a monitor screen.

On the other hand, the distorted circular image memory controller 340 is a control device for writing into and reading out data from the distorted circular image memory 440. Data of a distorted circular image S photographed by use of a fisheye lens-mounted digital camera 410 is to be written into the distorted circular image memory 440 by the distorted circular image memory controller 340. Further, whenever necessary, the distorted circular image memory controller 340 is also able to read out the data of the distorted circular image S inside the distorted circular image memory 440 and output it on the monitoring device 430, thereby displaying the distorted circular image S on a monitor screen. Still further, when coordinates (x, y) are given from the corresponding coordinate calculating unit 200, the distorted circular image memory controller 340 has a function of reading out a pixel value of a pixel positioned in the vicinity of the coordinates (x, y) from the data of the distorted circular image S inside the distorted circular image memory 440, thereby giving it to the pixel value determining unit 330.

Processes of forming the planar regular image T by the planar regular image forming unit 300 as shown in the figure will be performed as follows. Here, a description will be given for a case where the planar regular image T is constituted with pixel array data in which the U axis is disposed in a line direction and the V axis is disposed in a column direction. First, the uv coordinate value producing unit 310 produces a pair of coordinates (u, v) indicating one target pixel on a pixel array constituting the planar regular image T. The thus produced coordinates (u, v) are given from the uv coordinate value producing unit 310 to the corresponding coordinate calculating unit 200. Thereby, corresponding coordinates (x, y) which correspond to the coordinates (u, v) are calculated and these corresponding coordinates concerned (x, y) are given to the distorted circular image memory controller 340. As described above, the distorted circular image memory controller 340 reads out a pixel value of a pixel positioned in the vicinity of the coordinates (x, y) from data of the distorted circular image S inside the distorted circular image memory 440 and gives it to the pixel value determining unit 330.

The distorted circular image S is an image constituted with an aggregate of many pixels arranged at a position indicated by coordinates (x, y) on the two-dimensional XY orthogonal coordinate system. In reality, it is constituted with digital data which defines individually inherent pixel values at positions of many lattice points arrayed vertically and transversely at a predetermined pitch. Therefore, a position of the corresponding coordinates (x, y) calculated by the corresponding coordinate calculating unit 200 is usually positioned between a plurality of lattice points. For example, where the distorted circular image S is constituted with digital data which defines pixel values of many lattice points arrayed vertically and transversely at one pitch, any of the lattice points will be an integer value in terms of the coordinate value thereof. Therefore, if values of the corresponding coordinates x, y calculated by the corresponding coordinate calculating unit 200 are values including a decimal fraction (this will be expected in most cases), the position of the corresponding coordinates (x, y) is positioned between a plurality of lattice points. It is, therefore, impossible to determine only one corresponding pixel value.

Thus, in reality, when the pixel value determining unit 330 determines a pixel value of a target pixel on the planar regular image T arranged at a position indicated by coordinates (u, v), it is necessary to read out pixel values of a plurality of reference pixels on the distorted circular image S arranged in the vicinity of a position indicated by the corresponding coordinates (x, y), thereby performing interpolation operation for pixel values of the plurality of reference pixels. Since many methods to perform this interpolation operation are known, such as the bilinear interpolation method and the bicubic/spline interpolation method, a detailed description thereof will be omitted here. As a matter of course, there may be also adopted a method in which in place of performing the interpolation, a pixel value of the closest pixel at a position indicated by the corresponding coordinates (x, y) is determined as a pixel value of the target pixel, as it is.

Therefore, a pixel value of a target pixel determined by the pixel value determining unit 330 is given to the planar regular image memory controller 320. On the other hand, the thus produced coordinates (u, v) are given from the uv coordinate value producing unit 310 to the planar regular image memory controller 320. Then, the planar regular image memory controller 320 performs processing for writing a pixel value determined by the pixel value determining unit 330 as the pixel value of the target pixel positioned at coordinates (u, v) inside the planar regular image memory 420.

A description has been so far given for processing in which a pixel value is determined for one target pixel and written. The uv coordinate value producing unit 310 sequentially produces coordinates (u, v) indicating all pixels on a pixel array constituting the planar regular image T. Thereby, individual pixels are determined for their individual pixel values and written into the planar regular image memory 420.

Individual operation units of the corresponding coordinate calculating unit 200 are not necessarily subjected to recalculation every time the uv coordinate value producing unit 310 produces new coordinates (u, v). For example, a common coefficient G calculated by the common coefficient operation unit 210 is a value which is not dependent on u. Therefore, where only a coordinate value u of the coordinates (u, v) given from the uv coordinate value producing unit 310 has been changed, no recalculation is needed. As a result, where pixel array data is operated in which the U axis is disposed in a line direction and the V axis is disposed in a column direction, an operation newly executed for each line will suffice. Of operations performed by the xy coordinate value calculating unit 240, a new operation for each line will suffice in terms of values of "vB" and "vE" as well. As a matter of course, the rotational coefficient operation unit 230 is not required to perform a new operation unless there is some change in the visual line vector n or the planar inclination angle φ.

In the embodiment shown in FIG. 23, a part made up of the corresponding coordinate calculating unit 200 and the planar regular image forming unit 300 which act as constituents of an image converter is constituted with a semi-conductor integrated circuit into which an electronic circuit having the above processing functions is assembled. More specifically, the part made up of the corresponding coordinate calculating unit 200 and the planar regular image forming unit 300 is constituted with a dedicated LSI made of one chip. On the other hand, the parameter input unit 100 is constituted with another host controller LSI chip so as to cope with various user interfaces. In conclusion, the fisheye lens monitoring system is constituted by combining an LSI functioning as the parameter input unit 100, an LSI functioning as the corresponding coordinate calculating unit 200 and the planar regular image forming unit 300, the planar regular image memory 420, the distorted circular image memory 440, the fisheye lens mounted digital camera 410 and the monitoring device 430.

As a matter of course, in the fisheye lens monitoring system, a part functioning as an image converter, that is, a part made up of the parameter input unit 100, the corresponding coordinate calculating unit 200, the planar regular image forming unit 300, the planar regular image memory 420 and the distorted circular image memory 440 may be constituted by installing dedicated programs into a general-purpose computer. Further, it is also acceptable that the parameter input unit 100 and the rotational coefficient operation unit 230 shown in FIG. 23 are constituted by using a general-purpose computer, and other parts inside the corresponding coordinate calculating unit 200 are constituted with an LSI, thereby giving to the LSI rotational coefficients A to F calculated by the general-purpose computer.

In the examples described above, a center point of the thus obtained planar regular image is in alignment with an origin G of the UV coordinate system. However, a planar regular image is not necessarily an image cut out at the center of the origin G. Further, the image converter of the present invention is a device having a function of converting a part of a distorted circular image photographed by use of a fisheye lens into a planar regular image. However, an image to be converted by the device is not limited only to an image photographed by use of a fisheye lens. Any image, for example, an image photographed by use of a convex mirror to which a semi-sphere projection model similar to that photographed by use of a fisheye lens is applied can be subjected to image conversion by using the image converter of the present invention.

<<<Section 7. Application to Non-Orthogonal Projection Method>>>

All the embodiments described above are examples in which a fisheye lens based on the orthogonal projection method is used. Correspondence relationship equations used in image conversion are equations based on the distorted circular image S photographed by use of a fisheye lens according to the orthogonal projection method. However, commercially available fisheye lenses are in reality not necessarily lenses based on the orthogonal projection method. There are actually known various projection methods for fisheye lenses such as the equidistance projection method, stereographic projection method and equisolid angle projection method. Thus, fisheye lenses based on these various projection methods are used depending on applications. Herein, a description will be given for a method for applying the present invention to a non-orthogonally projected image photographed by use of a fisheye lens based on a non-orthogonal projection method.

Figure 24:
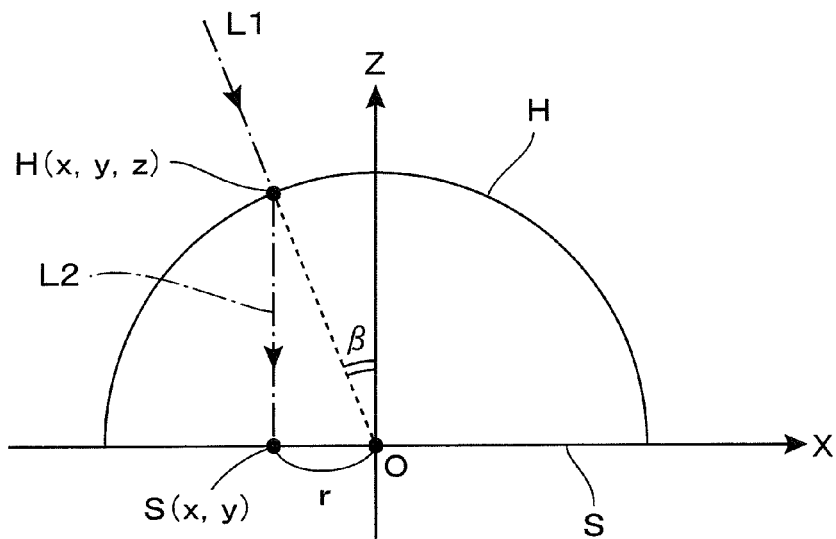
FIG. 24 is a side elevational view showing a projection state of incident light in a fisheye lens based on the orthogonal projection method.

As described above, the optical characteristics of a fisheye lens based on the orthogonal projection method may be explained with reference to a model shown in the FIG. 1. More specifically, characteristics are incident light L1 being made incident from the normal line direction to any given incident point H (x, y, z) on a virtual sphere H and which reaches a point S (x, y) on the XY plane as incident light L2 proceeding in a direction parallel to the Z axis. FIG. 24 is a front elevational view showing the projection state of incident light in a fisheye lens based on the orthogonal projection method. As shown in the figure, the incident light L1 made incident from the normal line direction to the incident point H (x, y, z) on the virtual sphere H having a zenithal angle β reaches the point S (x, y) on the XY plane, as the incident light L2 proceeding in a direction parallel to the Z axis.

In this case, a relationship between the zenithal angle β of the incident point H (x, y, z) and a distance r from an origin O of a reaching point S (x, y) at which the incident light L2, which has passed through the incident point H (x, y, z), reached the XY plane is expressed by the equation of r=f·sin β in the case of an orthogonally projected image photographed by use of a fisheye lens based on the orthogonal projection method. In this case, f is a constant inherent to the fisheye lens. On the other hand, for example, in the case of an equidistantly projected image photographed by use of a fisheye lens based on the equidistance projection method, the relationship between these will be expressed by the equation of r=f·β.

Figure 25:
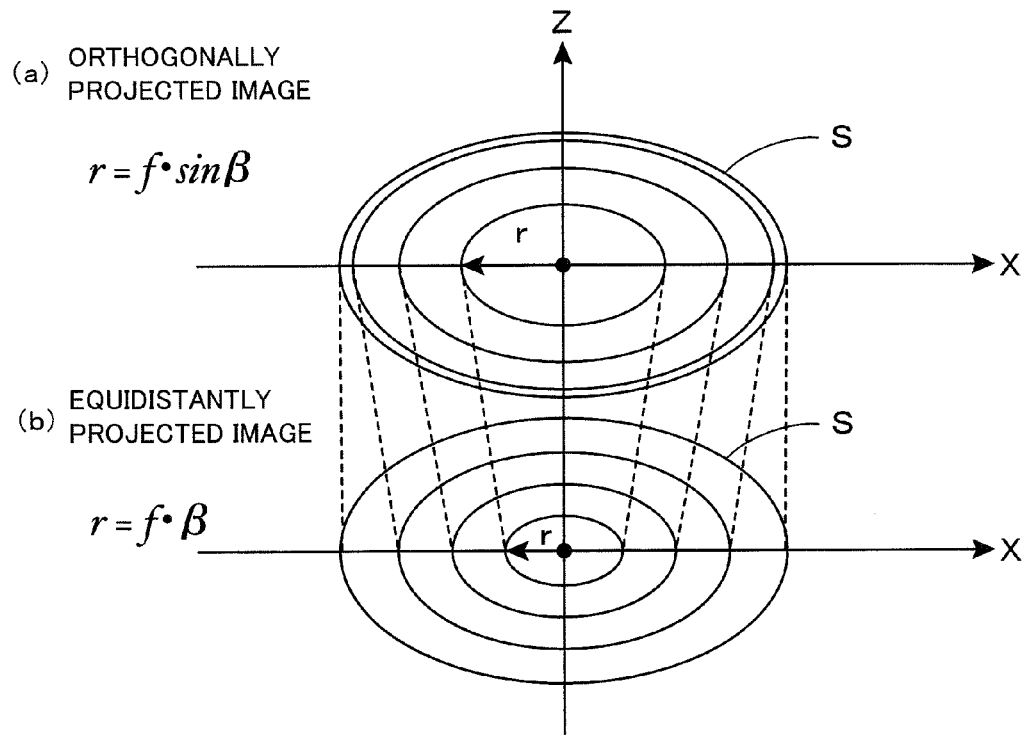
FIG. 25 is a perspective view showing a relationship between an orthogonally projected image formed by use of a fisheye lens based on the orthogonal projection method and an equidistantly projected image formed by use of a fisheye lens based on the equidistance projection method.

FIG. 25 is a perspective view showing a relationship between the orthogonally projected image formed by use of a fisheye lens based on the orthogonal projection method and the equidistantly projected image formed by use of a fisheye lens based on the equidistance projection method. Lines in a concentric pattern in the figure show an aggregate of reaching points on the XY plane for incident light which has passed through incident points having the same zenithal angle β. In the case of the orthogonally projected image shown in FIG. 25(a), the equation of r=f·sin β is satisfied. Therefore, an interval between adjacent lines in a concentric pattern is made smaller as it moves from the center to the periphery. On the other hand, in the case of the equidistantly projected image shown in FIG. 25(b), the equation of r=f·β is satisfied. Therefore, the lines in a concentric pattern are arranged in an equal interval from the center to the periphery.

As described above, the orthogonally projected image and the equidistantly projected image are common in that these are both distorted circular images. However, since there is a difference in the distorted state between these, transformation equations used for converting these into a planar regular image are also different accordingly. Thus, correspondence relationship equations for an orthogonally projected image shown in FIG. 21 can be used in converting an orthogonally projected image into a planar regular image. Therefore, when non-orthogonally projected images such as an equidistantly projected image are to be converted to planar regular images, it is necessary to use special correspondence relationship equations dedicated for each of these.

However, coordinates on the orthogonally projected image and coordinates on the non-orthogonally projected image can be converted to each other by using predetermined coordinate conversion equations. Therefore, in carrying out the present invention, where the distorted circular image S stored in the distorted circular image memory 440 is a non-orthogonally projected image photographed by use of a fisheye lens based on the non-orthogonal projection method, correspondence relationship equations for non-orthogonally projected images may be used which are obtained by using coordinate conversion equations between coordinates on the orthogonally projected image and coordinates on the non-orthogonally projected image to correct correspondence relationship equations for orthogonally projected images. Hereinafter, a description will be given for this method in a case where an equidistantly projected image is used as a non-orthogonally projected image.

As shown in FIG. 25, it is possible to define a one-for-one correspondence relationship between any given one point on the orthogonally projected image and one specific point on the equidistantly projected image (the broken line in the figure indicates this correspondence relationship). More specifically, if coordinates on any given one point on the equidistantly projected image are given as (xb, yb) and coordinates corresponding thereto on a specific one point on the orthogonally projected image are given as (xa, ya), the following equations are satisfied between these as shown above in FIG. 26:

$$xa = xb(R/r)\sin(\pi r/2R) \quad \text{Equation (19)}$$

$$ya = yb(R/r)\sin(\pi r/2R) \quad \text{Equation (20)}$$

wherein the condition is $r = \sqrt{xb^2 + yb^2}$.

On the other hand, if coordinates on any give one point on the orthogonally projected image are given as (xa, ya) and coordinates corresponding thereto on a specific one point on the equidistantly projected image are given as (xb, yb), the following equations are satisfied between these as shown below in FIG. 26:

$$xb = xa(2R/\pi r)\sin^{-1}(r/R) \quad \text{Equation (21)}$$

$$yb = ya(2R/\pi r)\sin^{-1}(r/R) \quad \text{Equation (22)}$$

wherein the condition is $r = \sqrt{xa^2 + ya^2}$.

In conclusion, the above equations (19), (20) are equations for converting the coordinates (xb, yb) on the equidistantly projected image into the coordinates (xa, ya) on the orthogonally projected image (hereinafter, referred to as a first coordinate conversion equation). The above equations (21), (22) are equations for converting the coordinates (xa, ya) on the orthogonally projected image into the coordinates (xb, yb) on the equidistantly projected image (hereinafter, referred to as a second coordinate conversion equation).

Thus, where an image stored in a distorted circular image memory 440 shown in FIG. 23 is an equidistantly projected image photographed by use of a fisheye lens based on the equidistance projection method, a corresponding coordinate calculating unit 200 may first calculate the corresponding coordinates (x, y), using correspondence relationship equations for orthogonally projected images described above. The thus calculated corresponding coordinates (x, y) are those corresponding to coordinates (xa, ya) on the orthogonally projected image. Therefore, the above-described second coordinate conversion equation is used to convert these into coordinates (xb, yb) on the equidistantly projected image, thereby giving the coordinates (xb, yb) after conversion to a planar regular image forming unit 300 as the corresponding coordinates (x, y).

Further, attention is needed also where the parameter input unit 100 receives such input instructions that one point on a distorted circular image S is designated as a cut-out center point P (x0, y0) and inputs a position of the cut-out center point P (x0, y0) as a parameter indicating a visual line vector n. As shown in the embodiments described above, where the distorted circular image S stored in the distorted circular image memory 440 is an orthogonally projected image photographed by use of a fisheye lens based on the orthogonal projection method, as in the model of FIG. 19, it is possible to define an intersecting point Q (x0, y0, z0) between a straight line passing through the cut-out center point P (x0, y0) and parallel to the Z axis and a virtual sphere H, thereby giving a vector which starts from an origin O to pass through the intersecting point Q (x0, y0, z0), as the visual line vector n. This is because, in the case of the orthogonal projection method, the corresponding point Q on the sphere is positioned at a position immediately above the cut-out center point P.

However, where the distorted circular image S stored in the distorted circular image memory 440 is a non-orthogonally projected image photographed by use of a fisheye lens based on the non-orthogonal projection method, the corresponding point Q on the sphere is not positioned immediately above the cut-out center point P. Thus, in this case, it is necessary that coordinate conversion equations between coordinates on the orthogonally projected image and coordinates on the non-orthogonally projected image are used to correct coordinates of the cut-out center point P, define an intersecting point Q between a straight line passing through a point after conversion and parallel to the Z axis and the virtual sphere H, thereby giving a vector which starts from an origin O to pass through the intersecting point Q as a visual line vector n.

Where the distorted circular image S is an equidistantly projected image, coordinates on the cut-out center point P designated as one point on the distorted circular image S correspond to coordinates (xb, yb) on the equidistantly projected image. Therefore, the above-described first coordinate conversion equation may be used to convert these into coordinates (xa, ya) on the orthogonally projected image, defining an intersecting point Q between a straight line passing through a point indicated by coordinates (xa, ya) after conversion and parallel to the Z axis and the virtual sphere H, thereby giving a vector which starts from an origin O to pass through the intersecting point Q as a visual line vector n.

Use of the above method makes it possible to apply, in principle, the conversion processing similar to that described above in the embodiments, even where the image stored in the distorted circular image memory 440 is an equidistantly projected image photographed by use of a fisheye lens based on the equidistance projection method. As a matter of course, this method shall not be limited to an application to equidistantly projected images but also widely applicable to non-orthogonally projected images in general.

What is claimed is:

1. An image converter for performing processes of cutting out a part of a distorted circular image photographed by use of a fisheye lens and converting said part into a planar regular image, the image converter comprising:

a distorted circular image memory for storing a distorted circular image constituted with an aggregate of many pixels arranged at a position indicated by coordinates (x, y) on a two-dimensional XY orthogonal coordinate system and having a radius R taking an origin O of the two-dimensional XY orthogonal coordinate system as a center;

a planar regular image memory for storing a planar regular image constituted with an aggregate of many pixels arranged at a position indicated by coordinates (u, v) on a two-dimensional UV orthogonal coordinate system;

a parameter input unit in which in a three-dimensional XYZ orthogonal coordinate system including the two-dimensional XY orthogonal coordinate system, a visual line vector n facing any given direction, with the origin O given as a starting point, is input as a parameter indicating a cut-out position of the planar regular image, a predetermined planar inclination angle φ is input as a parameter indicating a cut-out orientation of the planar regular image, and a predetermined magnification m is input as a parameter indicating a cut-out dimension of the planar regular image;

a corresponding coordinate calculating unit calculating corresponding coordinates (x, y) which correspond to any given coordinates (u, v) by using predetermined correspondence relationship equations showing a correspondence relationship between coordinates (u, v) on a two-dimensional UV cylindrical coordinate system and coordinates (x, y) on the two-dimensional XY orthogonal coordinate system, wherein said two-dimensional UV cylindrical coordinate system is defined by curving a two-dimensional UV orthogonal coordinate system which is arranged on a plane passing through a point G given as an origin and orthogonal to the visual line vector n to have an orientation according to the planar inclination angle φ, said point G being away from the origin O by "a product m≅→R of the magnification m and the radius R" on the visual line vector n, along a side face of a "virtual cylindrical column in which the point G gives one point on the side face thereof to have a central axis parallel to a V axis of the two-dimensional UV orthogonal coordinate system,"; and a planar regular image forming unit giving coordinates (u, v) of a target pixel constituting the planar regular image to the corresponding coordinate calculating unit to obtain corresponding coordinates (x, y), reading out a pixel value of a pixel arranged in the vicinity of the obtained corresponding coordinates (x, y) inside the distorted circular image memory, determining a pixel value of the target pixel on the basis of a read pixel value, thereby forming the planar regular image by determining pixel values of individual pixels, and writing the pixel values into the planar regular image memory; wherein when, with respect to a virtual sphere having the radius R taking the origin O as a center, a corresponding point Qi is taken on the sphere which corresponds to a point Si indicated by coordinates (xi, yi) on the two-dimensional XY orthogonal coordinate system depending on a projection method of a fisheye lens used, and coordinates (ui, vi) are taken on the two-dimensional UV cylindrical coordinate system at an intersecting point Ci between a straight line connecting the origin O with the corresponding point Qi on the sphere and a cylindrical column side-face coordinate plane of the two-dimensional UV cylindrical coordinate system, the corresponding coordinate calculating unit uses correspondence relationship equations by which the coordinates (xi, yi) are determined as corresponding coordinates which correspond to the coordinates (ui, vi);

when a distorted circular image stored in the distorted circular image memory is an orthogonally projected image photographed by use of a fisheye lens based on an orthogonal projection method, the corresponding coordinate calculating unit uses correspondence relationship equations of orthogonally projected images in which, with respect to a point Si indicated by coordinates (xi, yi), a point indicated by coordinates (xi, yi, zi) given as an intersecting point between a straight line passing through the point Si and parallel to a Z axis and the virtual sphere is given as a corresponding point Qi on the sphere, and when a distorted circular image stored in the distorted circular image memory is a non-orthogonally projected image photographed by use of a fisheye lens based on a non-orthogonal projection method, the corresponding coordinate calculating unit uses correspondence relationship equations of non-orthogonally projected images obtained by using coordinate conversion equations between coordinates on the orthogonally projected image and coordinates on the non-orthogonally projected image so as to correct the correspondence relationship equations of orthogonally projected images;

the corresponding coordinate calculating unit defines the two-dimensional UV cylindrical coordinate system by using the virtual cylindrical column in which the point G gives one point on the side face thereof to have a central axis parallel to the V axis of the two-dimensional UV orthogonal coordinate system and also passing through the origin O of the three-dimensional XYZ orthogonal coordinate system; and the corresponding coordinate calculating unit uses the following equations as correspondence relationship equations of orthogonally projected images indicating a correspondence relationship between coordinates (u, v) and coordinates (x, y), $x = G(u'A + vB + w'C)$ $y = G(u'D + vE + w'F),$ under the following definitions in which an angle formed between an orthogonal projection on the XY plane of a visual line vector n and a Y axis is given as an azimuthal angle α and an angle formed between the visual line vector n and a positive direction of the Z axis is given as a zenithal angle β, $A = \cos(\phi)\cos(\alpha) - \sin(\phi)\sin(\alpha)\cos(\beta)$ $B = -\sin(\phi)\cos(\alpha) - \cos(\phi)\sin(\alpha)\cos(\beta)$ $C = \sin(\beta)\sin(\alpha)$ $D = \cos(\phi)\sin(\alpha) + \sin(\phi)\cos(\alpha)\cos(\beta)$ $E = \sin(\phi)\sin(\alpha) + \cos(\phi)\cos(\alpha)\cos(\beta)$ $F = -\sin(\beta)\cos(\alpha)$ $G = R/\sqrt{(w^2 + v^2)}$ $w = mR$ $u' = w' \sin(u/w)$ $w' = w' \cos(u/w).$ 2. The image converter according to claim 1, wherein the corresponding coordinate calculating unit including:

a rotational coefficient operation unit in which, when the visual line vector n and the planar inclination angle φ are given from the parameter input unit, on the basis of the visual line vector n, the azimuthal angle α and the zenithal angle β, are determined, and rotational coefficients A, B, C, D, E, F are calculated on the basis of the following operational equations, $A = \cos(\phi)\cos(\alpha) - \sin(\phi)\sin(\alpha)\cos(\beta)$ $B = -\sin(\phi)\cos(\alpha) - \cos(\phi)\sin(\alpha)\cos(\beta)$ $D = \cos(\phi)\sin(\alpha) + \sin(\phi)\cos(\alpha)\cos(\beta)$ $E = \sin(\phi)\sin(\alpha) + \cos(\phi)\cos(\alpha)\cos(\beta)$ $F = -\sin(\beta)\cos(\alpha)$ $F = -\sin(\beta)\cos(\alpha)$ $G = R/\sqrt{(w^2 + v^2)}$ a common coefficient operation unit in which, when the magnification m is given from the parameter input unit and a coordinate v is given from the planar regular image forming unit, the radius R of the distorted circular image is used to calculate a common coefficient G on the basis of the following operational equations, $w = mR$ $G = R/\sqrt{(w^2 + v^2)};$ a curved coordinate correcting unit in which, when the magnification m is given from the parameter input unit and a coordinate u is given from the planar regular image forming unit, the radius R of the distorted circular image is used to calculate u' and w' on the basis of the following operational equations, $w = mR$ $u' = w' \sin(u/w)$ $w' = w' \cos(u/w);$ and an xy coordinate value calculating unit in which the coordinate v given from the planar regular image forming unit, the rotational coefficients A, B, C, D, E, F calculated by the rotational coefficient operation unit, the common coefficient G calculated by the common coefficient operation unit, the u' and w' calculated by the curved coordinate correcting unit, and the radius R of the distorted circular image are used to calculate x and y on the basis of the following operational equations, $x = G(u'A + vB + w'C)$ $y = G(u'D + vE + w'F).$ 3. The image converter according to claim 2, wherein
the parameter input unit has a function of inputting the radius R as a variable parameter on the basis of instructions from a user or a distorted circular image stored in a distorted circular image memory, and the common coefficient operation unit and the curved coordinate correcting unit use the radius R input by the parameter input unit to perform an operation.

4. The image converter according to claim 1, wherein
when a distorted circular image stored in the distorted circular image memory is an equidistantly projected image photographed by use of a fisheye lens based on the equidistance projection method, the corresponding coordinate calculating unit uses the following coordinate conversion equations for converting coordinates (xa, ya) on the orthogonally projected image into coordinates (xb, yb) on the equidistantly projected image, $xb = xa(2R/\pi r)\sin^{-1}(r/R)$ $yb = ya(2R/\pi r)\sin^{-1}(r/R)$ wherein the condition is $r = \sqrt{(xa^2 + ya^2)}$, thereby correcting the correspondence relationship equations of orthogonally projected images.

5. The image converter according to claim 1, wherein
the parameter input unit inputs coordinates (x0, y0) of a cut-out center point P on the two-dimensional XY orthogonal coordinate system as a parameter for defining the visual line vector n and defines a virtual sphere having the radius R at the center of an origin O in a three-dimensional XYZ orthogonal coordinate system, when a distorted circular image stored in the distorted circular image memory is an orthogonally projected image photographed by use of a fisheye lens based on the orthogonal projection method, the parameter input unit defines an intersecting point Q between a straight line passing through the cut-out center point P and parallel to the Z axis and the virtual sphere, thereby giving a vector which starts from the origin O to pass through the intersecting point Q as the visual line vector n, and when a distorted circular image stored in the distorted circular image memory is a non-orthogonally projected image photographed by use of a fisheye lens based on the non-orthogonal projection method, the parameter input unit uses coordinate conversion equations between coordinates on the orthogonally projected image and coordinates on the non-orthogonally projected image to correct coordinates of the cut-out center point P and defines an intersecting point Q between a straight line passing through a point after correction and parallel to the Z axis and the virtual sphere, thereby giving a vector which starts from the origin O to pass through the intersecting point Q as the visual line vector n.

6. The image converter according to claim 1, wherein the corresponding coordinate calculating unit arranges the two-dimensional UV orthogonal coordinate system in such an orientation that an angle formed between a rotational reference axis J given as an axis passing through an origin G, parallel to the XY plane and also orthogonal to the visual line vector n and the U axis is equal to the planar inclination angle $\phi$.

7. The image converter according to claim 1, wherein the planar regular image stored in the planar regular image memory is rectangular in contour, the two-dimensional UV orthogonal coordinate system having the U axis in a direction parallel to the longer side of the rectangle and the V axis in a direction parallel to the shorter side is curved along the side face of the virtual cylindrical column having a central axis parallel to the V axis, thereby defining the two-dimensional UV cylindrical coordinate system.

8. The image converter according to claim 1, wherein the planar regular image forming unit performs interpolation operation for pixel values of plural reference pixels on a distorted circular image arranged in the vicinity of a position indicated by corresponding coordinates (x, y) upon determination of a pixel value of a target pixel arranged at a position indicated by the coordinates (u, v).

9. A non-transitory computer readable recording medium containing a program for allowing a computer to function as the image converter according to claim 1.

10. A semiconductor integrated circuit into which electronic circuits functioning as a corresponding coordinate calculating unit and a planar regular image forming unit which are constituents of the image converter according to claim 1 are incorporated.

11. A fisheye lens monitoring system including:
the image converter according to claim 1;
a digital camera equipped with a fisheye lens; and
a monitoring device for displaying a planar regular image on a screen;
wherein a distorted circular image photographed by use of the digital camera is stored in the distorted circular image memory, and a planar regular image obtained in the planar regular image memory is displayed by the monitoring device.

* * * * *